US010795573B2

(12) United States Patent
MacIsaac et al.

(10) Patent No.: US 10,795,573 B2
(45) Date of Patent: Oct. 6, 2020

(54) METHOD AND APPARATUS FOR VIRTUAL BRAILLE KEYBOARD

(71) Applicant: International Business Machines Corporation, Armonk, NY (US)

(72) Inventors: Bruce J. MacIsaac, San Jose, CA (US); Rosanna S. Mannan, San Jose, CA (US); Lloyd A. Walls, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 15/227,659

(22) Filed: Aug. 3, 2016

(65) Prior Publication Data

US 2018/0039404 A1 Feb. 8, 2018

(51) Int. Cl.
*G06F 3/048* (2013.01)
*G06F 3/0488* (2013.01)
*G06F 3/01* (2006.01)
*G06F 3/16* (2006.01)

(52) U.S. Cl.
CPC .......... *G06F 3/04886* (2013.01); *G06F 3/016* (2013.01); *G06F 3/167* (2013.01); *G06F 2203/04809* (2013.01)

(58) Field of Classification Search
None
See application file for complete search history.

(56) References Cited

U.S. PATENT DOCUMENTS

| 7,039,522 | B2 * | 5/2006 | Landau .................. A61H 3/061 340/539.11 |
| 7,494,053 | B1 * | 2/2009 | Burns .................... G07F 19/20 235/379 |
| 8,612,856 | B2 | 12/2013 | Hotelling et al. |
| 8,791,910 | B2 | 7/2014 | Phillip |
| 8,842,091 | B2 | 9/2014 | Simmons et al. |
| 2002/0156807 | A1 * | 10/2002 | Dieberger ............... G06F 3/016 715/247 |

(Continued)

FOREIGN PATENT DOCUMENTS

| WO | 0139375 A1 | 5/2001 |
| WO | 03105097 A2 | 12/2003 |
| WO | 2015156744 A1 | 10/2015 |

OTHER PUBLICATIONS

Bonnington, Christina, "Touchscreen Braille Writer Lets the Blind Type on a Tablet", Wired, Oct. 12, 2011, http://www.wired.com/2011/10/touchscreen-braille-writer/, 10 pp.

(Continued)

*Primary Examiner* — Mohamed Abou El Seoud
(74) *Attorney, Agent, or Firm* — Patterson + Sheridan, LLP

(57) ABSTRACT

An apparatus includes a touchscreen having an input area and a processor. The apparatus also includes a memory that stores program code. The program code is executable by the processor to determine a location within the input area. The location corresponds to a position of at least a portion of an object relative to the input area. Further, the program code is executable by the processor to generate an output associated with an indication to move the object toward a region of the input area. The output is based on a comparison of the position of the object to the region. The region corresponds to a key of a keyboard.

5 Claims, 19 Drawing Sheets

(56) References Cited

U.S. PATENT DOCUMENTS

| | | |
|---|---|---|
| 2004/0001734 A1 | 1/2004 | Burrell, IV |
| 2005/0122313 A1* | 6/2005 | Ashby .................. G06F 3/0219 345/168 |
| 2012/0062357 A1* | 3/2012 | Slamka .................. G01C 21/20 340/4.11 |
| 2012/0113047 A1 | 5/2012 | Hanauer et al. |
| 2012/0119999 A1* | 5/2012 | Harris ................. G06F 3/04886 345/169 |
| 2012/0154324 A1* | 6/2012 | Wright .................. G06F 3/0416 345/174 |
| 2013/0249821 A1 | 9/2013 | Dharmaraja et al. |
| 2014/0191974 A1* | 7/2014 | Sako .................. G06K 9/00288 345/168 |
| 2014/0247237 A1* | 9/2014 | Chan .................. G06F 3/04883 345/174 |
| 2015/0262509 A1* | 9/2015 | Labbe .................. G09B 21/004 434/113 |
| 2015/0310762 A1 | 10/2015 | Seim et al. |
| 2015/0331528 A1 | 11/2015 | Robinson |
| 2016/0139671 A1* | 5/2016 | Jun ......................... G06F 3/016 715/702 |
| 2017/0185182 A1* | 6/2017 | Chandran ............. G06F 3/0418 |

OTHER PUBLICATIONS

Inpris Super Braille Keyboard Manual, Feb. 17, 2016, http://manual.inpris.co/, 10 pp.

Southern, Caleb, et al.,"An Evaluation of BrailleTouch: Mobile Touchscreen Text Entry for the Visually Impaired", Proceedings of the 14th International Conference on Human-Computer Interaction with Mobile Devices and Services. AMC, Sep. 2012, 10 pp.

"Braille", from Wikipedia, the Free Encyclopedia, viewed May 16, 2016; http://en.wikipedia.org/wiki/Braille, 14 pp.

"Blindness Solutions: Focus 40 Blue—Refreshable Braille Display", Freedom Scientific, http://www.freedomscientific.com/Products/Blindness/Focus40BrailleDisplay, 2016, viewed May 16, 2016, 2 pp.

"Floating Touch—Xperia Sola with Floating Touch", Developer World, Sony Mobile, http://developer.sonymobile.com/knowledge-base/technologies/floating-touch/, 2016, viewed May 16, 2016, 3 pp.

"Super Braille Keyboard", Android Apps on Google Play, viewed May 16, 2016, https://play.google.com/store/apps/details?id=com.upsense.keyboard.twohands&hl=en, 3 pp.

"Braille Touch", viewed Apr. 20, 2015, http://www.cc.gatech.edu/~mromero/brailletouch/, 4 pp.

* cited by examiner

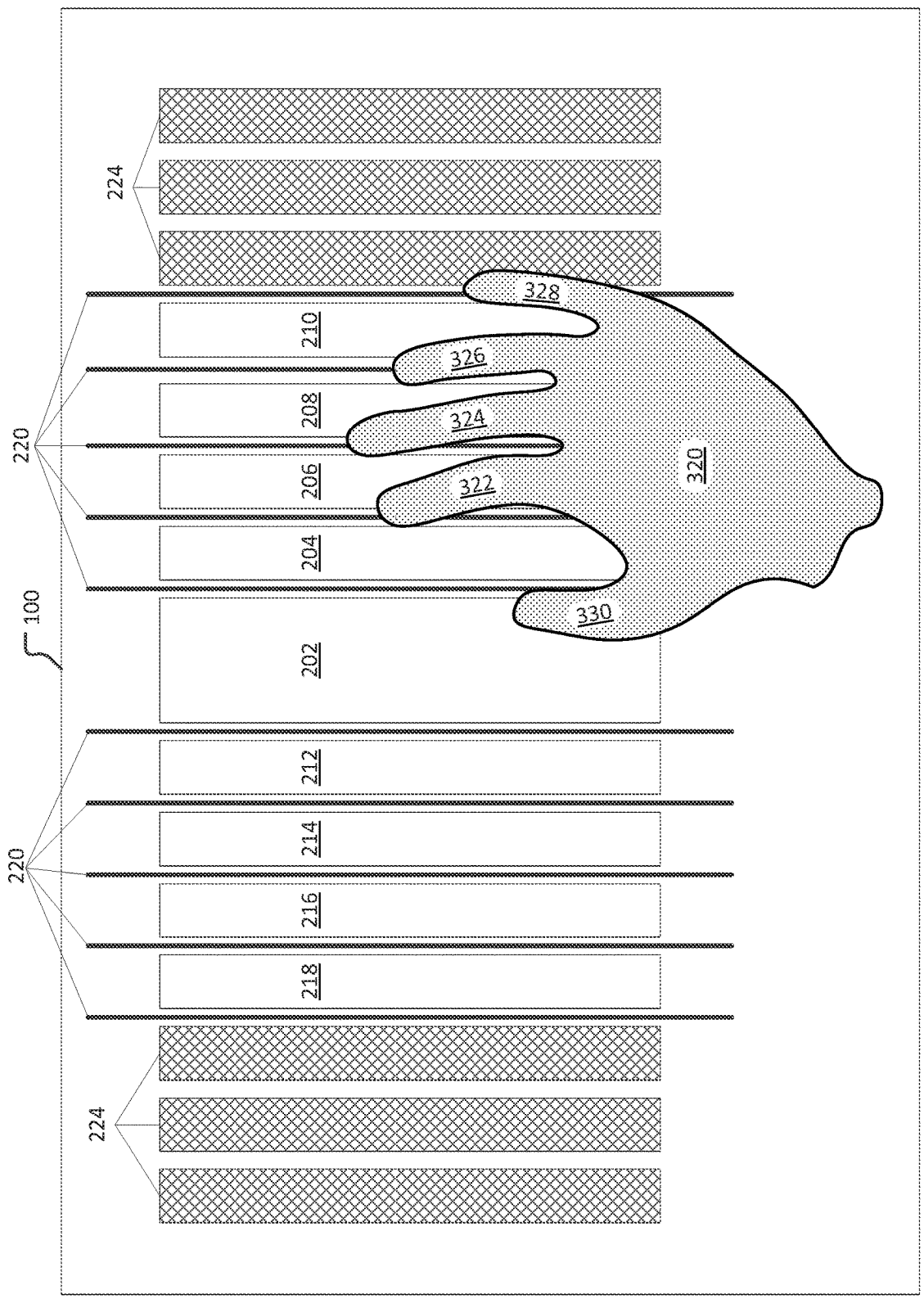

METHOD AND APPARATUS FOR VIRTUAL BRAILLE KEYBOARD

I. FIELD OF THE DISCLOSURE

The present disclosure relates to a method and apparatus for a virtual Braille keyboard.

II. BACKGROUND

Blind and visually impaired persons use Braille as a means of writing and reading text. Braille characters are generated by selective activation of a grid of dots. Various devices are available for entering Braille text data into a computer memory and for displaying stored Braille text data.

An example of a conventional Braille keyboard includes two sets of dot keys, one set for a left hand and a second set for a right hand, and a space key. The keys of the Braille keyboard are typically raised keys that can be located (e.g., detected) via touch by a visually impaired person. The Braille keyboard may be a stand-alone peripheral device capable of being connected to a computer. In some cases, a built-in Braille keyboard can be integrated into a computer. As computing devices have been reduced in physical size, it has become difficult to integrate the Braille keyboard into smaller computing devices (e.g., tablets or smartphones). Therefore, visually impaired users typically use a stand-alone Braille keyboard when using such computing devices.

Many computing devices (e.g., tablets, mobile phones) present a virtual keyboard via a touchscreen. A visually impaired user operating a computing device that includes a virtual keyboard presented via a touchscreen may be unable to locate the virtual keyboard or specific keys of the virtual keyboard, as a virtual keyboard displayed on a touchscreen generally does not provide physical references such as raised keys. Further, if a visually impaired user is able to align his or her fingers with the keys of a virtual keyboard presented via a touchscreen, the visually impaired user's fingers may inadvertently drift off key locations of a virtual keyboard during typing, as a visually impaired user cannot simply look down at the virtual keyboard to ensure that each of the user's fingers is positioned correctly with respect to the associated virtual key.

III. SUMMARY OF THE DISCLOSURE

The present disclosure enables a touchscreen to be used as a Braille keyboard by a visually impaired user. As an example, a computing system (e.g., a tablet, a mobile phone, a smartphone, a kiosk, an automatic teller machine, et al.) that includes a touchscreen may detect a finger position of a user to aid the user to align or to maintain alignment of his finger or hand with respect to at least one key of a virtual keyboard operative on the touchscreen.

In some implementations, the touchscreen may include or may be coupled to an array of capacitive sensors that are configured to detect an object, such as a user's hand or finger, relative to the touchscreen. The computing system may output non-visual feedback, such as an audio output or a tactile output, to assist a user to align, to maintain alignment, or both align and maintain alignment, of the user's fingers over the touchscreen keys as touchscreens do not have raised keys like a conventional Braille keyboard.

During operation of the computing system, the computing system may provide a first output (e.g., an audible output, a tactile output, or a combination thereof) to indicate a direction for a user to move his hand, or to move an individual finger, with respect to the keys. Additionally or alternatively, the computing system may provide a second output (e.g., an audible output, a tactile output, or a combination thereof) in response to the user's hand being aligned with the keys. In some implementations, after a user's hands are aligned with respect to one or more keys presented via the touchscreen, the computing system may provide a third output (e.g., an audible output, a tactile output, or a combination thereof) to indicate that the user's hands are drifting away from an aligned position with respect to the one or more keys.

In a first aspect of the disclosure, a method includes determining, at a device (e.g., a tablet, a smartphone), a location within an input area of a touchscreen of the device. The location corresponds to a position of at least a portion of an object (e.g., a finger of a user's hand) relative to the input area. The method also includes generating, at the device based on the location, an output associated with a direction to move the object toward a region of the input area. The region corresponds to a key of a keyboard.

In a second aspect of the disclosure, an apparatus includes a processor and a touchscreen having an input area. The apparatus also includes a memory that stores program code. The program code is executable by the processor to determine a location within the input area. The location corresponds to a position of at least a portion of an object (e.g., a finger of a user's hand) relative to the input area. The program code is also executable by the processor to generate an output associated with an indication to move the object toward a region of the input area. The region corresponds to a key of a keyboard. The output is based on a comparison of the position of the object to the region.

In a third aspect of the disclosure, a computer-readable storage medium includes instructions that cause a processor of an electronic device to perform operations of determining a location within an input area of a touchscreen of the electronic device. The location corresponds to a position of a portion of an object relative to the input area. The instructions further cause at least the processor to perform operations of generating an output associated with a direction to move the object toward a region of the input area. The region corresponds to a key of a keyboard.

One advantage of the aspects of the present disclosure is that touchscreen capacitive sensors are used to enable a device to assist a user, such as a visually impair user, to align or maintain alignment of the user's fingers over virtual keys instantiated on a touchscreen. The touchscreen capacitive sensors provide information to enable the device to determine a position of the fingers over or near the touchscreen. Further, directions in the form of a non-visual output, such as an audio output, a tactile output, or both, are provided to the user based on the received information to direct the user's fingers toward or to align the user's fingers with the virtual keys of a keyboard, such as a Braille keyboard, instantiated on the touchscreen. While the user's fingers are aligned with respect to the virtual keys of the keyboard, the user may type via the keyboard instantiated on the touchscreen.

IV. BRIEF DESCRIPTION OF THE DRAWINGS

FIGS. 4A-4J illustrate stages of a second example of operation of the device of FIG. 1;

V. DETAILED DESCRIPTION

Figure 1:
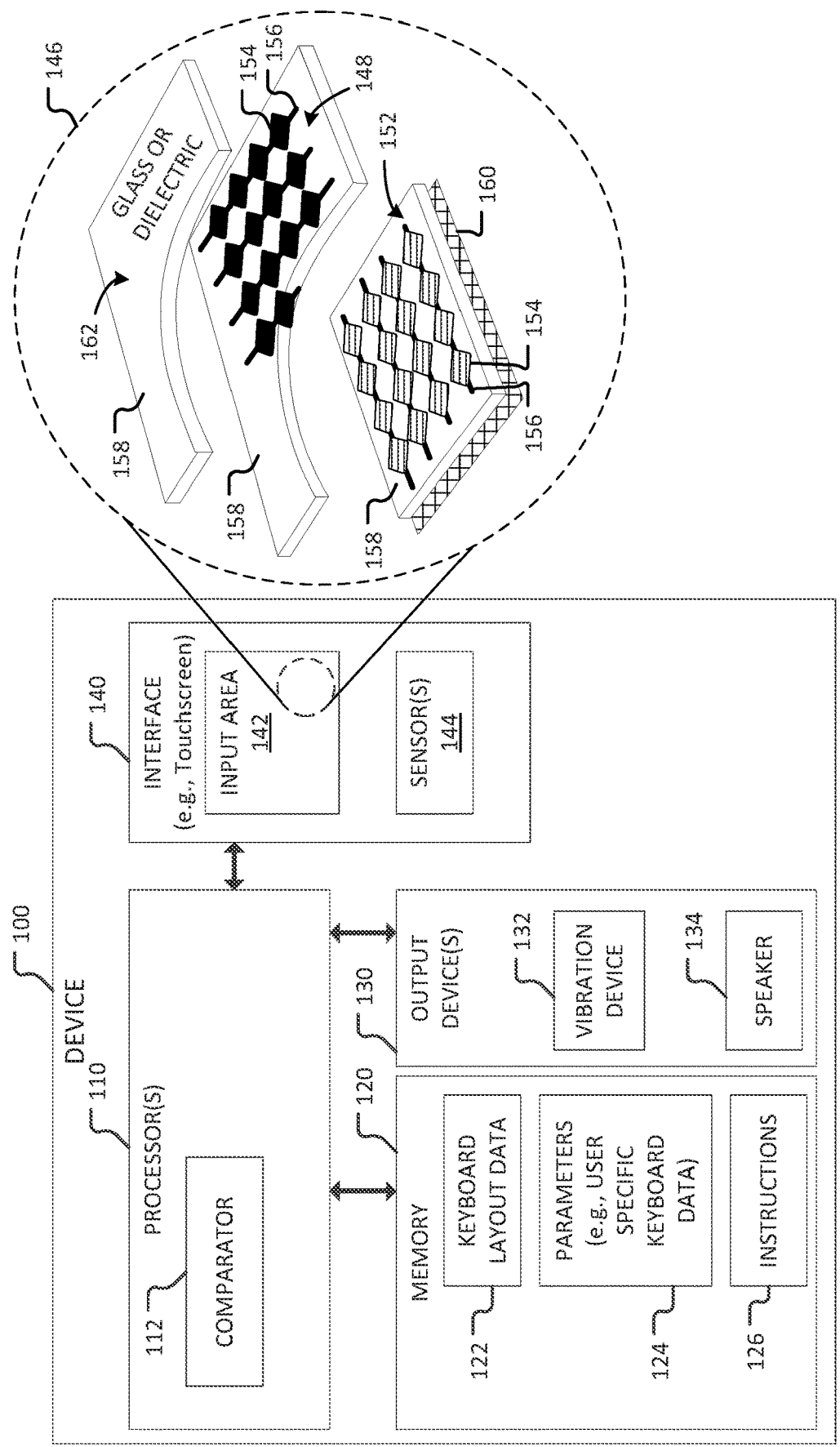
FIG. 1 is a block diagram illustrating an example of a device configured to facilitate alignment of an object with respect to a region of a touchscreen.

The present disclosure relates to a computing device that receives input via a keyboard, such as a virtual keyboard operating on a touchscreen. The computing device provides an output to assist a user, such as a visually impaired user, in locating the keyboard or specific keys of the keyboard (e.g., a Braille keyboard). Additionally or alternatively, once a user's fingers (or hands) are aligned to the keyboard, the computing device may provide an output to assist the user in maintaining alignment of the user's fingers (or hands) with respect to the keyboard. For example, the computing device may provide an output to the user to indicate that the user's finger has moved (e.g., drifted) out of alignment with a key of the keyboard operating on the touchscreen. In some implementations, the output may include an indication of a direction the user needs to move his or her finger to regain alignment.

The computing device may include program code that is executable by a processor to determine a location of the touchscreen that corresponds to a position of at least one finger of the visually impaired user relative to the touchscreen. The program code may also be executable by the processor to generate an output associated with an indication to move the finger toward a region (e.g., a key) of the touchscreen. In some implementations, once the computing device determines that the finger is positioned over the region (e.g., the key), the program code may cause the processor to generate another output associated with a second indication that the finger is positioned over or properly aligned with the region (e.g., the key) of the touchscreen.

In some implementations, the user may place his or her hands above or in contact with the touchscreen. The computing device may sense (e.g., using one or more capacitive sensors associated with the touchscreen) the user's fingers and may define regions of the touchscreen that correspond to the sensed position of the user's fingers. Each region may correspond to a different key of a virtual keyboard that may be enabled (e.g., generated) via the touchscreen. After the regions are defined, the user may begin typing via the virtual keyboard. During use of the virtual keyboard, the computing device may monitor (e.g., track) a position of the user's fingers or hands via the one or more capacitive sensors. If the computing device determines that at least one finger of the user is drifting away from a corresponding defined region of a key, the computing device may provide one or more outputs to instruct the user to move his or her finger(s) or hand(s) back into alignment with one or more regions (e.g., one or more keys). Although examples herein are described with reference to a virtual Braille keyboard that is active or operating on a touchscreen, the examples herein are equally applicable to a device that operates another type of keyboard on a touchscreen and to a device that has a built-in (physical) keyboard.

By sensing a position of the user's hands relative to the touchscreen, the computing device may determine a location on the touchscreen that corresponds to the user's hands. Additionally, by comparing the location to at least one key of a virtual keyboard, the computing device may identify when the user's hands become misaligned (or are on the verge of becoming misaligned) with respect to the keys of the virtual keyboard. Based on a determination that the user's hands are misaligned or about to be misaligned, the computing device may advantageously provide one or more non-visual outputs to instruct the user to move his or her hand(s) so that the user's hand is aligned with the keys of the virtual keyboard. The non-visual outputs may aid a visually impaired user to align and or maintain alignment of his or her fingers with a virtual keyboard presented via a touchscreen. Accordingly, the computing system described herein may enable a visually impaired user to use a virtual keyboard presented via a touchscreen despite the visually impaired user not being able to see or feel the keys of the virtual keyboard.

FIG. 1 is a block diagram illustrating an example of a device 100 configured to facilitate alignment, to maintain alignment, or both facilitate alignment and maintain alignment, of an object with respect to a region of a capacitive touchscreen. In some implementations, the region corresponds to a key of a Braille keyboard presented via the touchscreen.

The device 100 includes at least one processor, such as a processor 110, a memory 120, one or more output devices 130, and an interface 140 (e.g., a capacitive touchscreen). The processor 110 may include a single processor or multiple processors. In some implementations, the processor 110 may include a single processing core or multiple processing cores. The device 100 may be selected from a mobile phone, a tablet, a computer, a kiosk (e.g., a user terminal located at an airport, a restaurant), an automatic teller machine (ATM), a communications device, a music player, a video player, an entertainment unit, a navigation device, a personal digital assistant (PDA), and a fixed location data unit, into which the interface 140, the processor 110, the memory 120, at least one output device 130, or combination thereof, are integrated.

The interface 140 may include an input area 142 and one or more sensors 144. In some implementations, the input area 142 includes a display that is configured to show one or more images, such as an image associated with a keyboard, graphics associated with an operating system or graphics associated with content media. The input area 142 may include various components of a touchscreen including columns 148 and rows 152 of electrodes 154 connected by traces 156, as illustrated with reference to callout 146 of FIG. 1. The columns 148 and the rows 152 may be coupled to the one or more sensors 144 positioned within the device 100. The columns 148 and the rows 152 may operate independently from one another. Further, a first column may operate independently from a second column, and a first row may operate independently from a second row. To illustrate, the first column may be enabled (be in an "on" state) while the second column is disabled (in an "off" state or a low power state).

The columns 148 of electrodes 154 are separated from the rows 152 of electrodes 154 by a layer of glass or dielectric material 158. The dielectric material 158 may be transparent. An electric shielding layer 160 is mounted under the columns 148 and the rows 152 of electrodes 154. The layers of dielectric material 158, the columns 148 of electrodes 154, and the rows of electrodes 154 are stacked on top of one another when assembled into the input area 142 of the device 100. The configuration of the input area 142 depicted at 146 is not intended to be limiting and it is to be understood that other input areas, other configurations, and other components are possible.

A detection event or sensed location is identified near the input area 142 at a location with respect to a column 148, with respect to a row 152 or with respect to both a column 148 and a row 152. A detection event occurs when a conductive object (e.g., finger, fingertip, hand) is brought near or touches a top surface 162 of the upper-most dielectric material 158. Each sensed location (e.g., a particular row 152 of electrodes 154, a particular column 148 of electrodes 154) may be associated with a different sensor of the one or more sensors 144. Sensors 144 are connected to the rows 152 and columns 148 of electrodes 154 by the traces 156 that extend to the edges of the input area 142.

To facilitate an increased ability for detection, one or more of the columns 148 or one or more of the rows 152 may be selectively activated or selectively deactivated. For example, when the orientation of the device 100 is in a portrait mode, the one or more sensors 144 aligned with the rows 152 may be selectively activated for sensing at least a portion of the object and the one or more sensors 144 aligned with the columns 148 may be selectively deactivated. Selectively deactivating the one or more sensors 144 aligned with the columns 148 (while sensors aligned with the rows 152 are activated) reduces a ghosting effect in which the presence of a single object results in an array of capacitive sensors sensing two objects. In an alternate implementation, while in the portrait mode, one or more sensors 144 aligned with the columns 148 may be activated while sensors 144 aligned with the rows 152 are deactivated. In another example, when the orientation of the device 100 is in a landscape mode, such as when a longer dimension of the device 100 (e.g., the interface 140, the input area 142) is substantially parallel with the horizon, the one or more sensors 144 aligned with the rows 152 may be selectively deactivated for sensing and the one or more sensors 144 aligned with the columns 148 may be selectively activated for sensing at least the portion of the object.

The one or more sensors 144 may be configured to provide a signal to the processor 110. The processor 110 may include one or more comparators, such as a representative comparator 112. Although the comparator 112 is described as being included in the processor 110, in other implementations, the comparator 112 may be distinct from the processor 110. For example, the comparator 112 may be a separate device or component from the processor 112. The comparator 112 (i.e., a comparator device or comparison circuitry) determines location information of the object relative to the input area 142. The location information may correspond to a position of at least a portion of the object relative to the input area 142.

The one or more sensors 144 may include a capacitance sensor (e.g., self-capacitance sensor, mutual capacitance sensor). For example, each of the self-capacitance sensors may be configured to measure a current to a ground. In an example, the one or more sensors 144 include mutual capacitance sensors. The mutual capacitance sensors are configured to enable current passing through one sensor to pass over into an adjacent sensor. The mutual capacitance sensors may enable the one or more sensors 144 to detect multiple touches on the input area 142. Although the one or more sensors 144 are described as capacitance sensors with respect to FIG. 1, in other implementations, the one or more sensors 144 may additionally or alternatively include an array of infra-red sensors, an array of ultra-sonic sensors, or a combination of different sensor types. For example, the one or more sensors 144 may include an array of capacitive sensors and an ultrasonic sensor. The ultrasonic sensor may be configured to detect an object and to provide position information that may be used to confirm a position of an object detected by the array of capacitive sensors.

The sensors 144 may be used to determine at least one position of an object—such as a first object (e.g., finger, fingertip, hand)—above, proximate to, near or in contact with the surface of the input area 142. The processor 110 may determine a location by determining a highest change of capacitance within a particular region over multiple active columns. Alternatively, a location may be determined to be the first-in-time location where a capacitance exceeds or satisfies a threshold value for the particular hardware interface 140. In a further alternative, a location may be determined as a geometric center of a region determined by recording locations where capacitive values exceed a threshold any time between a start time of a first detected touch and a predetermined duration from the start time. That is, a center column location can be selected when several contiguous columns 148 are activated and all rows 152 are deactivated. In a specific example, for detection in five consecutive columns 152 that reach a maximal sensor value, a middle column can be selected as the location for that location determination.

Figure 2:
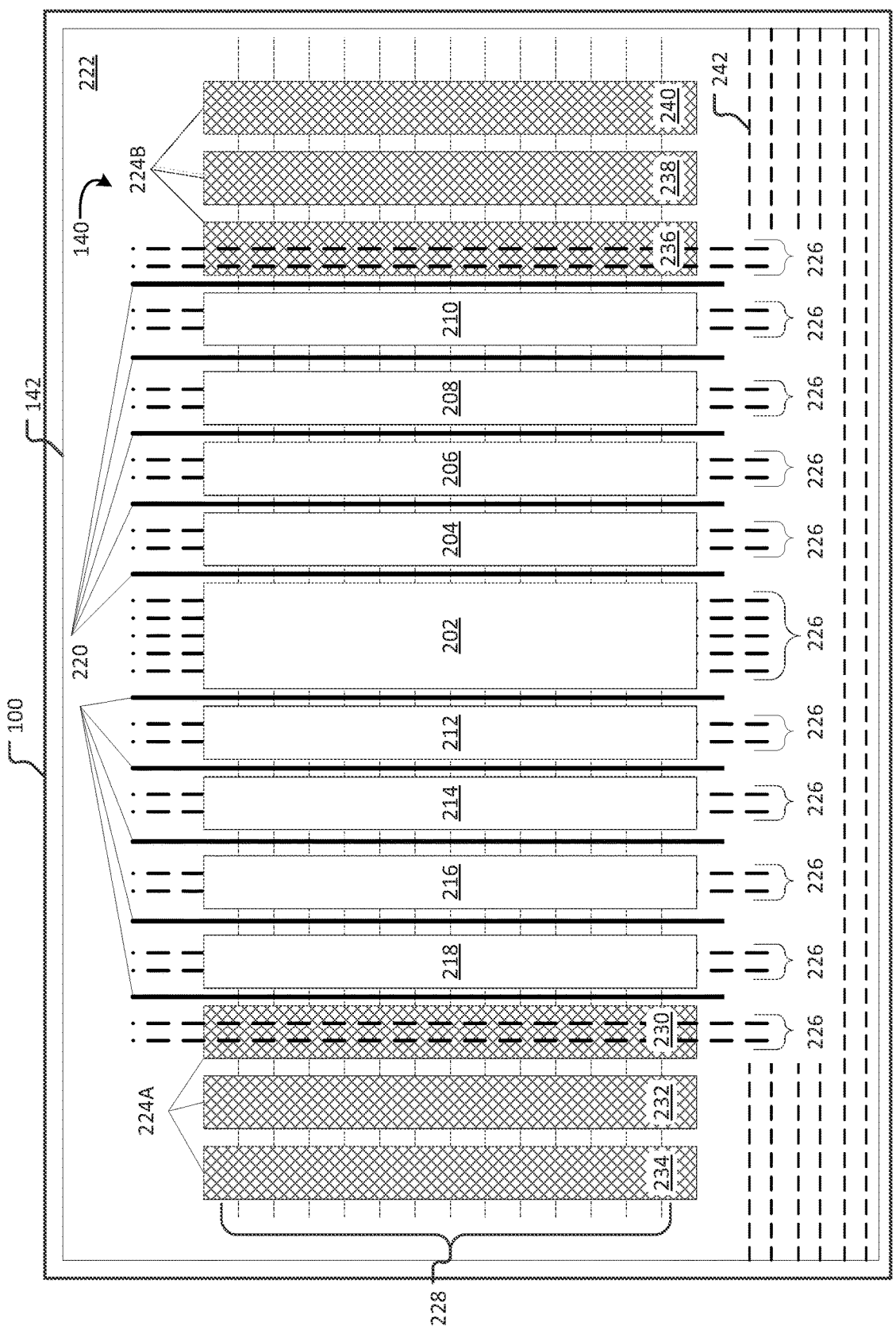
FIG. 2 is a diagram illustrating aspects of an example of an interface of the device of FIG. 1.

The comparator 112 may be used to generate data or signals that are used by the processor 110 to determine positions for one or more portions of an object with respect to one or more regions, such as the illustrated regions 202, 204, 206, 208, 210, 212, 214, 216, and 218 of FIG. 2 as described further herein. For example, each of multiple portions of the object may correspond to a different finger of a hand of a user. In another example, each portion of the object may correspond to a prosthetic finger of a prosthetic hand. In addition to determining a position, the comparator 112 may be further configured to perform a second comparison between a threshold and a distance between a detected location of an object and a defined region of the input area 142. The defined region may correspond to a key of the virtual keyboard or to an edge of the input area 142.

The memory 120 may be a random-access memory (RAM), a read-only memory (ROM), a hard disk, a solid state drive, an optical drive, and/or a removable drive that may further include drive controllers and other hardware. The memory 120 may store keyboard layout data 122, one or more parameters 124 (e.g., user specific keyboard data), and a plurality of instructions 126. An auxiliary storage may also be used and may be similar to the memory 120, and include the keyboard layout data 122, the one or more parameters 124, the plurality of instructions 126, or a combination thereof. The plurality of instructions 126 may cause the processor 110 to perform a number of operations, as described throughout herein.

The keyboard layout data 122 may correspond to a typing mode, and may include one or more keyboard configurations. The keyboard configurations may include a Braille keyboard configuration or some other keyboard or keypad configuration.

The one or more parameters 124 may correspond to a user profile. The user profile may include information that indicates how the input area 142 is to be divided into multiple regions during a particular user's use of the device 100. For example, the user profile may instruct the processor 110 to divide the input area 142 into regions 202, 204, 206, 208, 210, 212, 214, 216, and 218 of FIG. 2. For example, the user profile may indicate that the user has relatively large fingers and that the specific shape for each region may be larger and the layout of the regions 202-218 may include a larger space between each of the regions 202-218 as compared to a set of regions for a user profile corresponding to a user with small fingers. As another example, the user profile may indicate that the user is missing a finger(s). In this example, the device 100 determines positions for that particular number of fingers. A keyboard layout can include a set of key regions where each region is distinguished by detection of location of objects in either a horizontal (column) direction or a vertical (row) direction.

At least one output device 130 may include a speaker 134 configured to generate audio output. The audio output may be associated with a command to move the object (e.g., the user's hand, a finger of the user's hand). For example, the command to move the object may include an audible or verbal command to move the object left or right with respect to the input area 142. A first command may be configured to mean a left direction with respect to a position of a left hand. A second command may be configured to mean a right direction with respect to the left hand. As another example, the command to move the object may include an audible signal such as a simple tone at a certain pitch. As a user moves the object, the pitch of such audible signal varies in pitch with the position of the object relative to the surface of the device.

In another example, an audible signal varies in pitch according to a first object detected relative to the interface 140, second object detected relative to the interface 140, and so forth. The tempo of the audible signal varies according to a location of a particular object relative to a target. Once the device 100 determines that an object has reached a target region, the audible signal ceases. In this example, the audible signals are provided in series, from one to another, until all objects are aligned with the interface 140. By way of illustration, a user is guided to place a first finger over a first button (first target region) and subsequently is guided to place a second finger over a second button (second target region).

In another example, the command to move the object may include a verbal command (e.g., pre-recorded sound, computer generated verbal expression) that the object is oriented over the correspondingly appropriate region for the object. For example, a right hand is positioned over an appropriate set of keys of a keyboard designated for the right hand.

Alternatively, or in addition, the at least one output device 130 may include a vibration-based device 132 configured to generate a vibration output. The vibration output may be associated within an indication to move the object to a designated location. The vibration output or vibration signal may vary temporally (e.g., slow down) as the object is brought closer to a designated position.

During operation, the various components described above operate together to enable a user to use of a keyboard operating on a touchscreen without the user needing to look at or rely on visual indicators associated with keys or key regions. According to one illustrative scenario, a sequence of events occurs as follows.

A user desires to initiate a keyboard on the device 100. A user brings an object (e.g., a hand, a finger, multiple fingers) proximate to the input area 142 of the device 100 and touches the input area 142. The one or more sensors 144 and the comparator 112 detect the location of the object relative to the input area 142 of the interface 140 (e.g., touchscreen). The processor 110 interprets the initial detection (e.g., a particular motion, a particular combination of touches to the input area 142) as a signal for the device 100 to invoke and operate a keyboard in at least a portion of the input area 142.

The user lifts the object (e.g., the hand, the fingers) away from the surface of the input area 142. Next, the device 100 invokes the keyboard by defining key regions corresponding to activating certain of the columns 148 or the rows 152 of the input area 142 of the interface 140. The keyboard is operative through further detecting of objects (e.g., hands, fingers, fingertips) by the electrodes 154 of the columns 148 or by the electrodes 154 of the rows 152 of the interface 140. Once the user lifts the object from the surface of the input area 142, the key regions of the keyboard may be used by the user touching the respective key regions to form words and so forth. It is presumed in this scenario that the user initially maintained his hands and fingers in proper alignment over the keyboard such that the user's hands and fingers are initially aligned with the key regions of the keyboard when the keyboard is first invoked. No guidance at this point in time is needed for the user.

During use, the device 100, through the sensors 144 and the electrodes 156, tracks the locations of objects (e.g., hands, fingers, fingertips) proximate to the input area 142. Over time, one or more objects (e.g., hands, fingers, fingertips) may drift away from alignment with respective key regions defined for the input area 142. In this scenario, the comparator 112 of the device 100 determines that a portion of the drifting object (not illustrated in FIG. 1) is no longer sufficiently aligned with the keyboard. The device 100 identifies a drift condition (e.g., a tracked object has drifted or is drifting toward a direction outside of a key region). The comparator 112 generates and provides an output to the output device 130 corresponding to the drift condition. The output may be associated with a direction to move the object (e.g., a hand of, one or more fingers of a hand) toward a key region of the input area 142.

Next, the device 100 tracks the object with respect to the key region. The device 100 generates another output that indicates to the user when the object is correctly oriented with respect to the keyboard operating via the interface 140 and the input area 142. The user is then again free to operate the keyboard through interaction with the key regions operative in the input area 142. Over time, the device 100 continues to track one or more objects (e.g., fingers) of the user's hands in the input area 142 as the user operates the keyboard as long as the keyboard is active.

In summary, the device 100 through the output device 130 provides a feedback signal to the user if an object drifts out of alignment with one or more key regions of the keyboard as the user uses the keyboard. The user responds to the feedback as the user operates the keyboard until the user is finished using the keyboard. The output signals from the device thus aid a user, such as a visually impaired user, in maintaining proper alignment of his fingers over a keyboard, such as a Braille keyboard shown in FIG. 2.

The particular operation of the components of the device 100 provide various advantages and benefits. For example, the device 100 is able to track multiple objects (e.g., hands, fingers, fingertips) with respect to the input area 142 of the interface 140. The device 100 is able to interact with multiple objects at any given time through the input area 142. The device 100 is able to provide realtime feedback to a user based on locations of various objects brought near to the input area 142. Through the feedback, a user is able to maintain his fingers in alignment with a keyboard or any other user interface element without relying on any visual cue. Without the use of visual cues, a user is able to interact with a keyboard or any other user interface element active in the input area 142 of a capacitive touchscreen.

FIG. 2 is a diagram illustrating aspects of an example of an interface 140 of the device 100 of FIG. 1. In FIG. 2, the input area 142 of the device 100 is divided into multiple regions 202-218. Each of the regions 202, 204, 206, 208, 210, 212, 214, 216 and 218 of FIG. 2 corresponds to a key of a keyboard such as a Braille keyboard. In this example, regions 202-218 are vertical keys of the Braille keyboard. While the regions 202-218 are illustrated as only covering a portion of the top surface 222 of the device 100, the regions 202-218 may extend vertically from one edge to another edge across an entirety of the input area 142 of the interface 140.

Columns 226 and rows 228 may correspond to the columns 148 and the rows 152 of FIG. 1. In an example, the orientation of the device 100 may be in a landscape mode and one or more of the columns 226 may be selectively activated for sensing at least a portion of the object and one or more rows 228 may be selectively deactivated for sensing. In another example, the orientation of the device 100 may be in a portrait mode and one or more rows 228 may be selectively activated for sensing at least a portion of the object and one or more columns may be selectively deactivated for sensing. In each example, the one or more sensors 144 of FIG. 1 may be configured to be positioned within the device 100 to be aligned with the columns 226 and the rows 228. The dividing lines 220 or positioned between the regions 202-218. The dividing lines 220 are conceptual lines for sake of illustration only. The regions 202-218 are shown with gaps between successive regions, but may be contiguous with one another in other implementations.

Although the center region 202 is illustrated as a single region, the center region 202 may be divided into multiple sub-regions such as a first sub-region for a thumb of a left hand and a second sub-region for a thumb of a right hand. For a Braille keyboard, the region 212 corresponds to a dot 1 key, the region 214 corresponds to a dot 2 key, the region 216 corresponds to a dot 3 key, the region 204 corresponds to a dot 4 key, the region 206 corresponds to a dot 5 key, and the region 208 corresponds to a dot 6 key. The region 218 corresponds to a line spacer key, and the region 210 corresponds to a backspace key. Regions 224 correspond non-key regions.

As depicted in FIG. 2, the keyboard has been instantiated or invoked on the device 100. An object such as a finger placed over or near one or more of the key regions 202-218 is detected or tracked by one or more rows 228 or columns 226 of sensor electrodes corresponding to a respective region 202-218. For example, when columns 226 of electrodes are activated, a detection event is triggered in one or more of the columns 226 corresponding to one or more regions 202-218. When columns 226 are activated, the rows 228 of sensors are deactivated which reduces ghosting effects and enables multiple objects near the device 100 to be detected or tracked at the same time with respect to the key regions 202-218.

Regions 224A, 224B are alignment detection regions for the keyboard. In some implementations, regions 224A on the left side of key region 218 may be used to detect whether an object (e.g., a hand, a finger) has strayed from the region 218 on a left side of the left-most region 218. Additionally or alternatively, regions 224B on the right side of key region 210 may be used to detect whether an object (e.g., a hand, a finger) has strayed from the region 210 on a right side of the device 100. In use, fingers are placed over or near the key regions 202-218. When a user desires to activate a key, the user moves his finger downward toward a top surface 222 of the device 100 toward the respective key region 202-218. A particular key is activated in response to a user making contact with one of the key regions 202-218 presented via the interface 140.

In terms of a sequence of events in relation to FIG. 2, during operation, a user identifies the input area 142 of the interface 140. The user provides a signal to the device 100 to invoke a keyboard on the interface 140. Key regions 202-218 are formed for the interface 140 and the device 100 begins detecting and tracking objects (e.g., portions of the hands of a user) with respect to the input area 142. According to one embodiment, in order to first instantiate active key regions 202-218, a user brings his fingers toward a top surface 222 of the device 100. The device 100 is configured to generate a start signal to the user. The start signal communicates to the user that the key regions 202-218 are active and that the user's fingers are aligned with the keyboard. For example, the device 100 may be configured to produce the start signal based on detection of proper alignment of one object (e.g., finger, thumb, palm of hand) with a single region 202-218. Alternatively, the device may be configured to produce the start signal based on detection of proper alignment with multiple objects (e.g., multiple fingers) with respect to multiple regions 224 adjacent to key regions 202-218 of the keyboard (e.g., at least one key region 202-218, at least one left key region 202, 212-218 and at least one left key region 202-210, at least two left key regions 202, 212-218 and at least one right key region 202-210).

Once the key regions 202-218 of the keyboard are operational, the device 100 determines if the user's fingers or hands are aligned with the key regions 202-218 of the keyboard. The device 100 is configured to provide an output or signal to the user indicating that a portion of an object (e.g., a hand, a finger) is not aligned with one of the key regions 202-218. That is, if a left hand (not illustrated) is or has moved too far to the left of the key regions 202, 212-218, the device 100 detects an object at one of the alignment regions 224A. For example, if the device 100 detects an object at a first left alignment region 230, the device emits a tone at a first frequency. The user takes corrective action and moves his left hand. The device 100 continues to emit the tone at the first frequency as long as the object is detectable near the first left alignment region 230. If the user moves his left hand further left, a second detection region 232 detects the new position of the left hand. The device 100 ceases to emit the tone at the first frequency and instead emits a tone at a second frequency. This change in tone indicates to the user that the user has moved his left hand in a wrong direction in terms of alignment with the key regions 202, 212-218 of the keyboard. If the user moves his left hand in a right direction from alignment region 230 back to the left-most key region 218, the device 100 ceases to produce the tone at the first frequency. This event (i.e., ceasing of the alignment signal) communicates to the user that the user's left hand has been re-aligned with the left key regions 202, 212-218 of the keyboard. When the left hand is aligned with the left key regions 202, 212-218, the device 100 emits no signal to the user.

The device 100 is configured to do similarly with a right hand with reference to the alignment regions 224B. To illustrate, when a right hand (not illustrated) moves too far to the right of the key regions 202-210, the device 100 detects an object at one of the alignment regions 224B. For example, if the device 100 detects an object at a first right alignment region 236, the device emits a tone at a third frequency. The user takes corrective action and moves his right hand. The device 100 continues to emit the tone at the third frequency. If the user moves his hand further right, a second right-side detection region 238 detects the new position of the right hand. The device 100 ceases to emit the tone at the third frequency and instead emits a tone at a fourth frequency. This change in tone indicates to the user that the user has moved his right hand in a wrong direction in terms of alignment with the key regions 202-210 of the keyboard. If the user moves his right hand in a left direction from alignment region 236 back to the right-most key region 210, the device 100 ceases to produce the tone at the third frequency. This event (i.e., ceasing of the alignment signal for the right hand) communicates to the user that the user's right hand has been re-aligned with the right key regions 202-210 of the keyboard.

The third frequency for a right hand may be the same or different from the first frequency in reference to alignment of a left hand. A third frequency different from a first frequency allows a user to distinguish a signal to re-align a left hand versus a signal to re-align a right hand.

In the example shown in FIG. 2, there are three alignment regions 230-234 on the left side of the key regions 202-218 and three alignment regions 236-340 on the right side of the key regions 202-218. More or less than three alignment regions 224A on the left side of the keyboard are possible and more or less than three alignment regions 224B on the right side of the keyboard are possible. An alignment detection region 224A, such as the first alignment detection region 230, may overlap with a left-most key region 218 such that the device 100 may be configured to provide an alignment signal that serves as a warning signal to the user even though the user's fingers may not be out of alignment but are drifting or trending toward misalignment with respect to an alignment detection region such as a first left side alignment region 230. The same applies to the right side. That is, the first right alignment detection region 236 may be configured to overlap with the right-most key region 210.

In the example shown in FIG. 2, if a user moves his hand upward or downward, the device 100 cannot detect such movement within the key regions 202-218 because the indicated rows 228 have been deactivated. In the input area 142 of the interface 140, for vertically aligned key regions 202-218, certain rows 242 of electrodes may be active so as to be able to detect and track objects vertically below the key regions 202-218. Generally, individual rows of electrodes may be separately activated or deactivated. In other embodiments, the key regions 202-218 extend from a top edge to a bottom edge of the input area 142 which may correspond to having all rows of the input area 142 inactivated. Alternatively, some of the rows such as rows 242 may be active in the input area 142 in addition to some or all of the columns 226 being active. For an object that strays below a bottom edge of the key regions 202-218, the device 100 may be configured to generate and emit a signal indicating a vertical misalignment. Such signal may be distinct from a signal indicating a horizontal misalignment with respect to the key regions 202-218 of the keyboard.

Figure 3A:
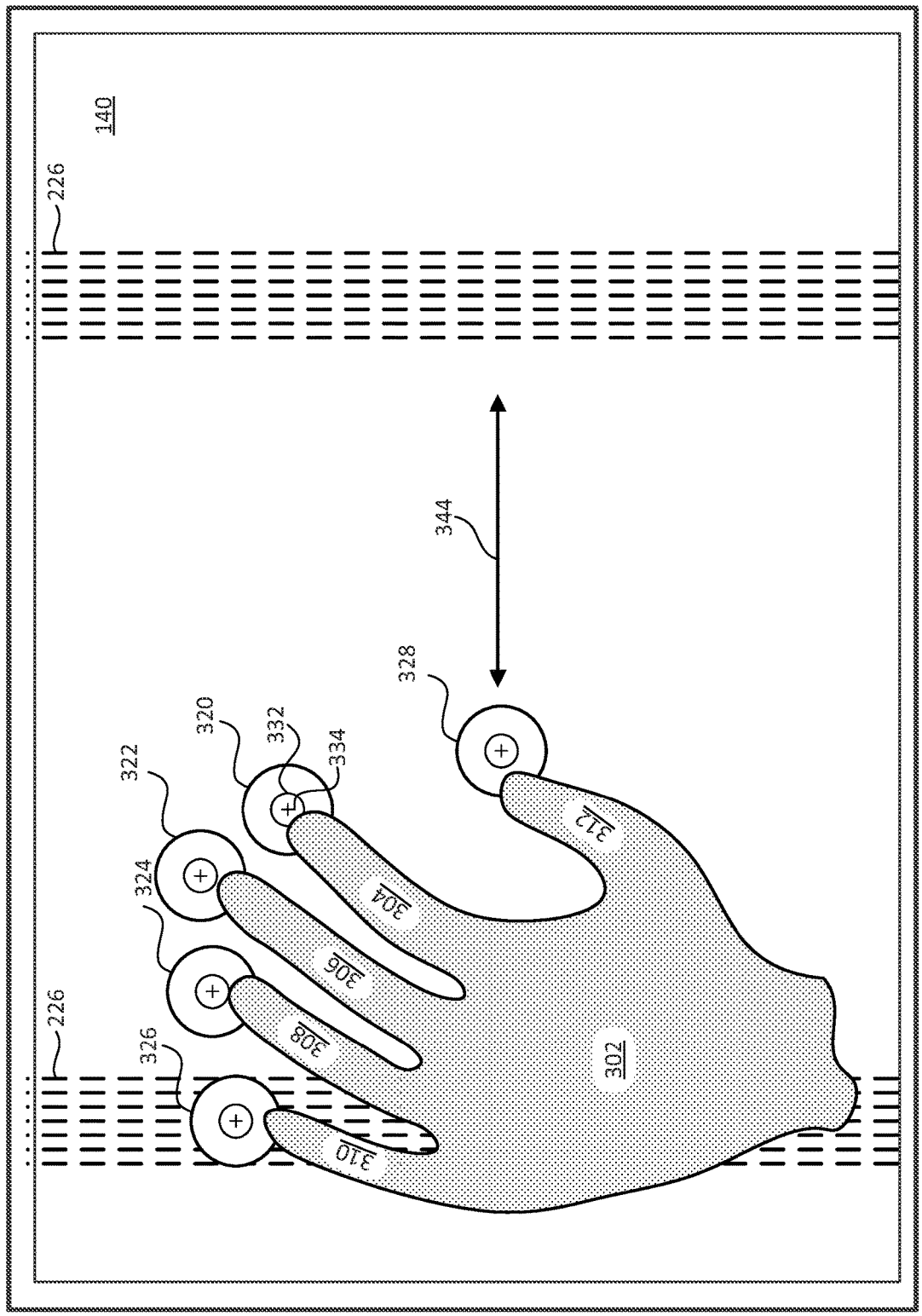
FIGS. 3A-3D illustrate stages of a first example of operation of the device of FIG. 1.

FIGS. 3A-3D illustrate another example of different stages of operation of the device 100 of FIG. 1. FIG. 3A illustrates a first stage of operation of the device 100 of FIG. 1. An object 302 of a user is positioned over the device 100. The object 302 may be a hand or one or more portions 304-312 (e.g., finger tips, detected parts of a hand). As shown, the object 302 corresponds to a user's left hand. The object 302 may include one or more portions 304, 306, 308, 310 and 312. Each of the one or more portions 304-312 may correspond to a finger or thumb on the user's left hand. For sake of clarity of illustration, a user's right hand is omitted from FIG. 3A. Based on a proximity to one or more sensors 144 of FIG. 1, these sensors 144 may generate signals for each of the portions 304-312. A few columns 226 of sensors 144 are illustrated. Columns 226 of sensors 144 are active across the entire interface 140. Each sensor 144 can generate data, and the data can correspond to a coordinate or coordinates in a memory 120 such as data related to keyboard layout data 122 or parameters 124. The data distinguish a location for each of the objects 302-312 along a horizontal axis 344 of the interface 140. The data can lead to formation or definition of a corresponding touch-activatable region 320, 322, 324, 326 and 328 on the interface 140 of the device 100. Each of the regions 320-328 may or may not be visible on the interface 140 even when activated. Visible regions 320-328 may not be needed for a visually impaired user. Each of the regions 320-328 may correspond to the different keys of a keyboard or input into the device 100. While a circular region is shown for each activatable region 320-328, each region 320-328 may be rectangular, ovoid, square or another shape. Rectangular shaped regions 202-218 are shown in FIG. 2.

Returning to FIG. 3A, as one example of operation, each of the regions 320-328 is initially formed and centered on the coordinates 334 of a contact region 332 for each finger when the user first positions her hand 302 over the interface 140 or contacts the interface 140. For sake of clarity of illustration, only one contact region 332 and one set of coordinates (e.g., crosshair ("+")) is labeled. The coordinates 334 for the respective touches may be determined as described elsewhere herein. The coordinates 334 alternatively may be the locations of the portions 304-312 detected proximate to the device 100. In some implementations, once the keys of the keyboard (regions 320, 322, 324, 326 and 328) are defined, the keys remain in a fixed location on the interface 140 during use of the keyboard.

In some implementations, the device 100 may be programmed with instructions 126 to create regions 320-328 of a fixed (e.g., pre-set) size spread out maximally over the available columns 226 of the touch sensors 144 associated with the interface 140. One example of a maximal layout is illustrated in FIG. 2. In other implementations, the size of each region 320-328 is variable when instantiated and thereafter remains fixed. In yet other implementations, the size of each region 320-328 is variable over time as a user interacts with the device 100. For example, the size of each region 320-328 may be determined based on a distance between adjacent coordinates 334. As another example, the size of each region 320-328 may be based on a numeric multiple of an initially detected size of a contact region 332, one size for each finger 304-312 initially placed or brought near the interface 140. The device 100 detects a size for each finger 304-312 initially brought near the interface 140 at the time the key regions are invoked. Once formed, the user continues to use the regions 320-328 as keys on the keyboard or key regions for the keyboard.

Figure 3B:
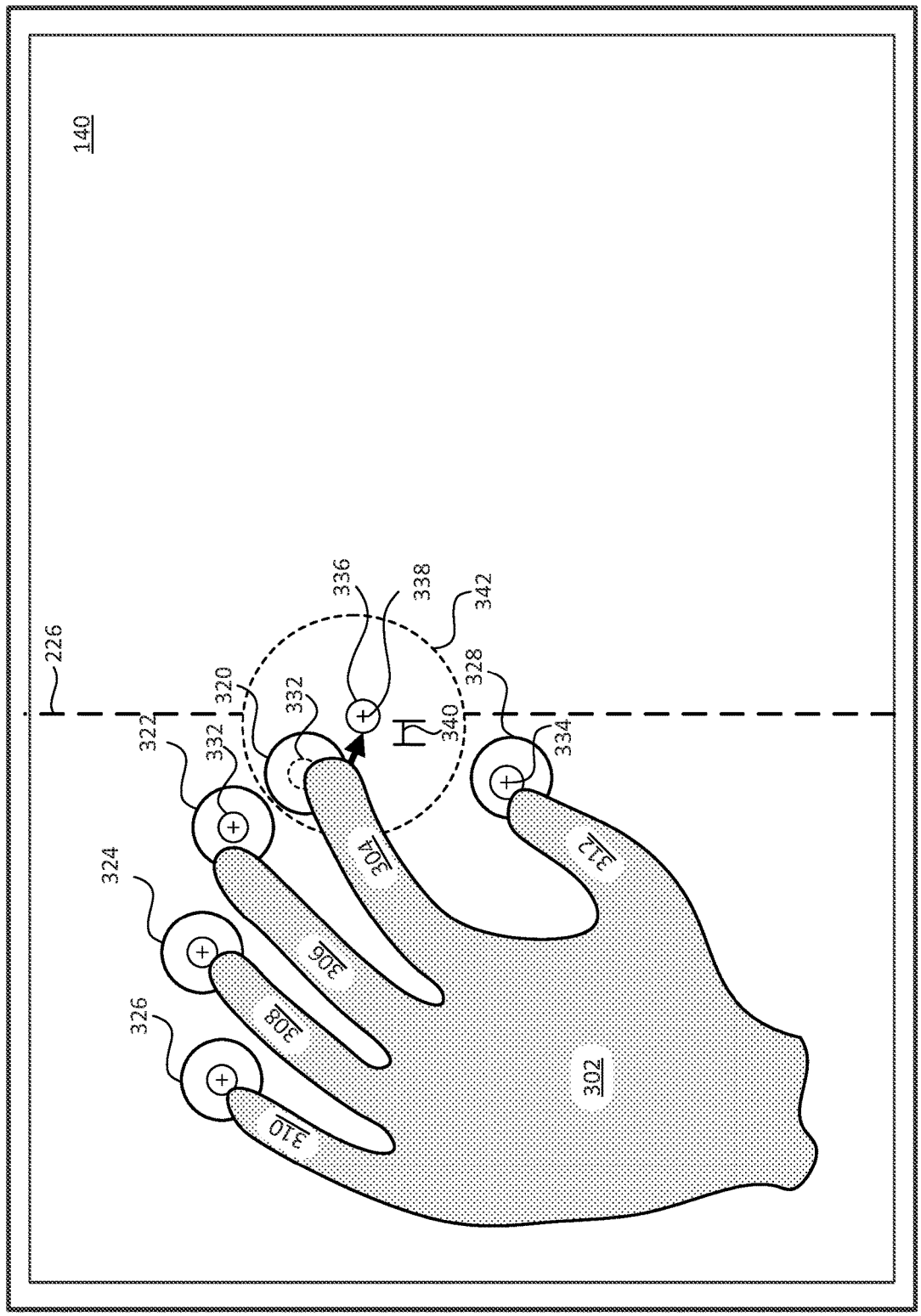

FIG. 3B illustrates a second stage of operation of the device 100 of FIG. 1 subsequent in time to the first stage of FIG. 3A. With reference to FIG. 3B, a user's index finger corresponding to portion 304 has drifted out of alignment with the region 320 as indicated by an arrow. The user's index finger has drifted such that the device 100 detects the user's index finger at a second coordinate 336 (identified with crosshairs 338) that is outside of the respective button region 320. The detection is made with one or more columns 226 of sensors. Upon a first and each successive detection of the location of the portion 304, comparator 112 determines that the portion 304 centered at position 338 is at least within a threshold distance 340 from a boundary of the proximate region 320. If the position 338 is outside of this distance 340, the device 100 generates a signal to the user (as described elsewhere) that the region 336 (touch detected at region 336) is not activatable by the portion 304 because the portion 304 is determined to be outside (e.g., above a region outside) the activatable region 320 of the interface 140. During the time that the portion 304 has drifted off of the region 320, the device 100 generates a signal and transduces the signal such as through an output device 130. The transduced signal indicates to a user that the portion 304 is out of bounds or outside a boundary of the region 320 or beyond a distance 340 outside of the region 320. Once the device 100 determines that the portion 304 returns within the boundary of the region 320, the signal ceases. The absence of the signal indicates to the user that the portion 304 is properly positioned again.

Figure 3C:
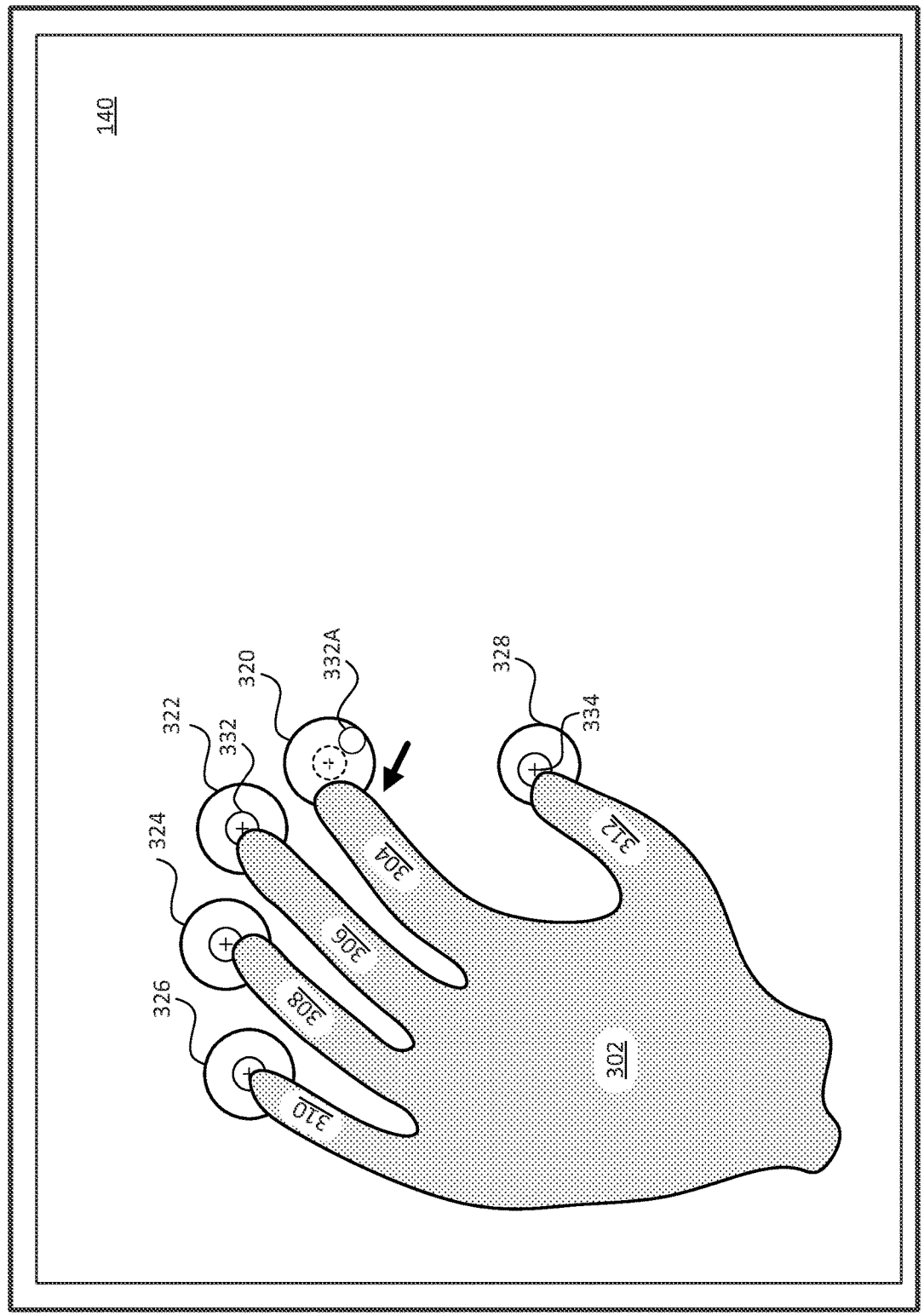

FIG. 3C illustrates a third stage of operation of the device 100 of FIG. 1 successive in time to that of FIG. 3B. With reference to FIG. 3C, by way of example of use, a user has responded to a corrective signal for portion 304 (e.g., left index finger) and has begun moving the portion 304 over the interface 140 and has again regained a position aligned with region 320. A likely new point of contact is indicated by a second region 332A that is within the boundaries of the region 320. As illustrated, the key region 320 remains in the same location through each of FIG. 3A, FIG. 3B and FIG. 3C. As illustrated, a corrective action is to move the portion 304 (generally, a hand or finger) to a designated location proximate and above the interface 140. In FIG. 3C, an arrow indicates the direction of movement of the corrective action. While a corrective action is described as detected for a single object or portion (e.g., portion 304), the corrective action detected by the device 100 and the corrective action taken by the user may be movement of an entire hand 302 or a plurality of the multiple portions 304-310.

Figure 3D:
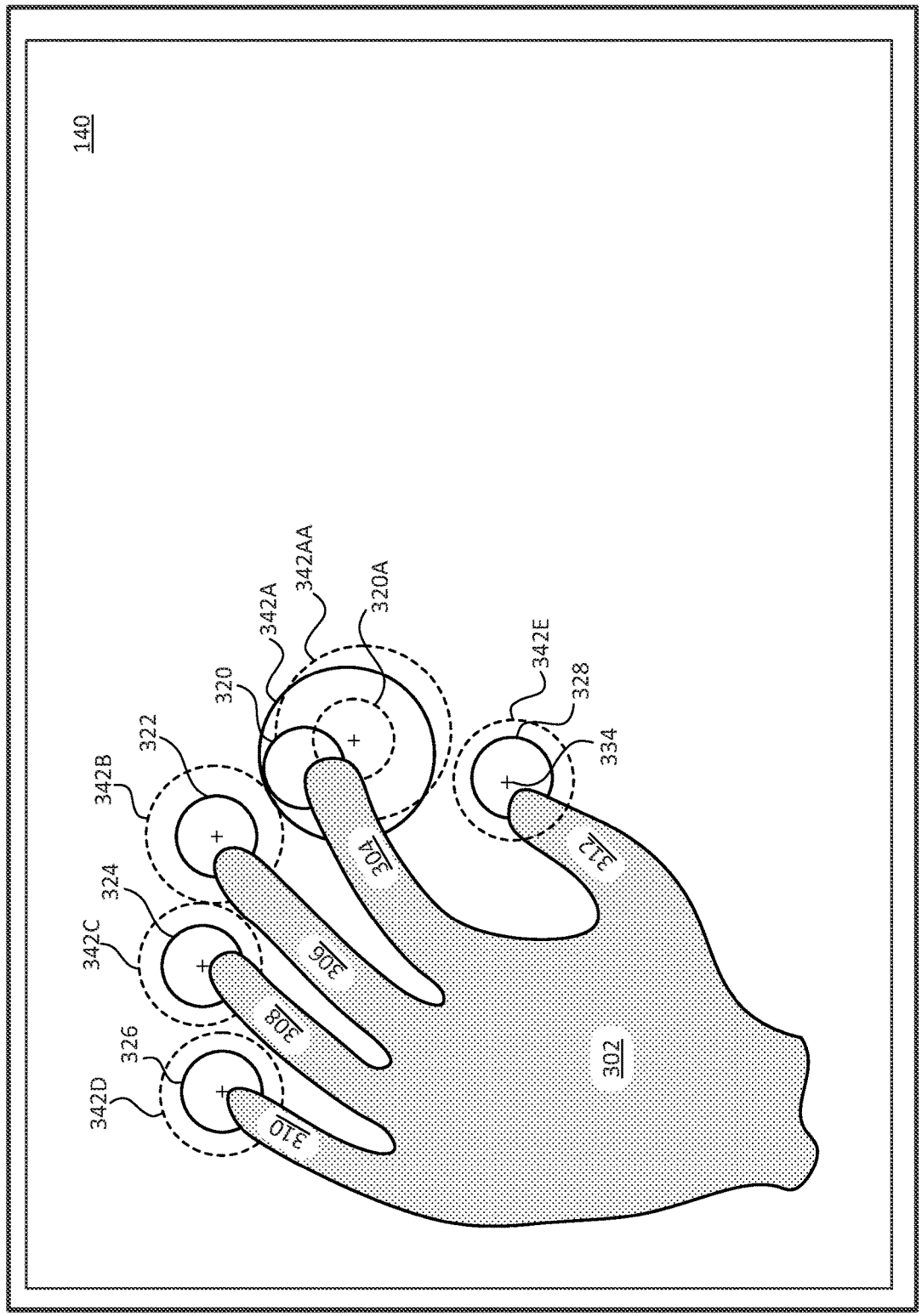

FIG. 3D illustrates another example of implementing guidance with respect to using a key regions 320-328. According to this example, the device 100 defines an out-of-bounds region 342A-E for each of the respective key regions 320-328. The out-of-bound regions 342A-E are created during instantiation of the keyboard. As a user interacts with the interface 140, a center coordinate 334 of each portion 304-312 moves along with detection of each portion 304-312. Alternatively, each portion 304-312 moves with each detection of a keystroke. That is, the device 100 detects a new center location 334 for a single respective key region 320, 322, 324, 326 or 328 each time a new position is detected or each time a key stroke is made. By way of illustration, for a first portion (e.g., a left index finger 304), the instructions 126 move both the key region 320 to a new key region 320A and the out-of-bounds region 342A to the new region 342AA. The new regions 320A, 342AA have moved downward and to the right relative to their respective original positions 320, 342A. The new regions 322A and 342AA are re-drawn based on the new center 334.

In this example, the new regions 322A and 342AA satisfy two requirements. First, the new key boundary 320A must be within its original out-of-bounds region 342A. Second, the new out-of-bounds region 342AA must not cross into another out-of-bounds region 342B-E such as region 342B or region 342E and must not cross outside of the interface 140. In this way, the key regions 320-328 may dynamically move around the interface 140 as a user keeps his hand near the interface 140. Keystrokes can then be made without the user constantly fighting to keep his fingers acutely aligned over static original key boundaries. If any portion 304-312 moves outside of a respective valid location within regions 342A-E, the device generates a signal to the user. The user can then use the signal to re-align his hand back over the interface 140 such that the key regions 320-328 are again viable to receive keystrokes as described in reference to FIG. 3D. One scheme for providing a re-alignment signal is described in relation to regions 224A, 224B in FIG. 2.

Alternatively, instead of dynamically moving a key region 320-328, each key region 320-328 remains in a fixed location on the interface 140 at a position initially determined at the time of keyboard instantiation. Activatable key regions may be circular such as shown in FIGS. 3A-D, or may be vertically oriented rectangular key regions 202-218 such as those illustrated in FIG. 2.

During use and over time, the device 100 tracks the location of the portions 304-312 over the interface 140 relative to a boundary, such as boundary 320-328 or relative to a set of larger regions 342A-E, one for each key region 320-328. Once a portion such as portion 304 drifts outside of its corresponding out-of-bounds region 342A, the active key region 322 is de-activated and a signal or a command is communicated to the user to re-implement or re-instantiate the key 320. Alternatively, the entire keyboard may be deactivated upon detection of a location violation. A signal or a command is then provided to re-instantiate the entire keyboard. Instantiating the keyboard is described elsewhere herein. A process similar to instantiating a keyboard can be used to reinstantiate a single key on an interface 140. The examples described herein presume a sufficiently large area on a touchscreen for a keyboard and room for a set of key regions such as regions 320-328 and for out-of-bounds regions 342A-E for each of the key regions 320-328.

FIGS. 4A-4J illustrate multiple exemplary stages of another operation of the device 100 of FIG. 1. These figures illustrate a sequence for aligning all fingers of two hands relative to an interface such as interface 140. In certain other implementations, such alignment functionality may be implemented with a single finger (e.g., an index finger), with fewer than all fingers at once or in sequence, or with one or two hands. Alignment is with respect to keys or with respect to a keyboard on an interface.

Figure 4A:
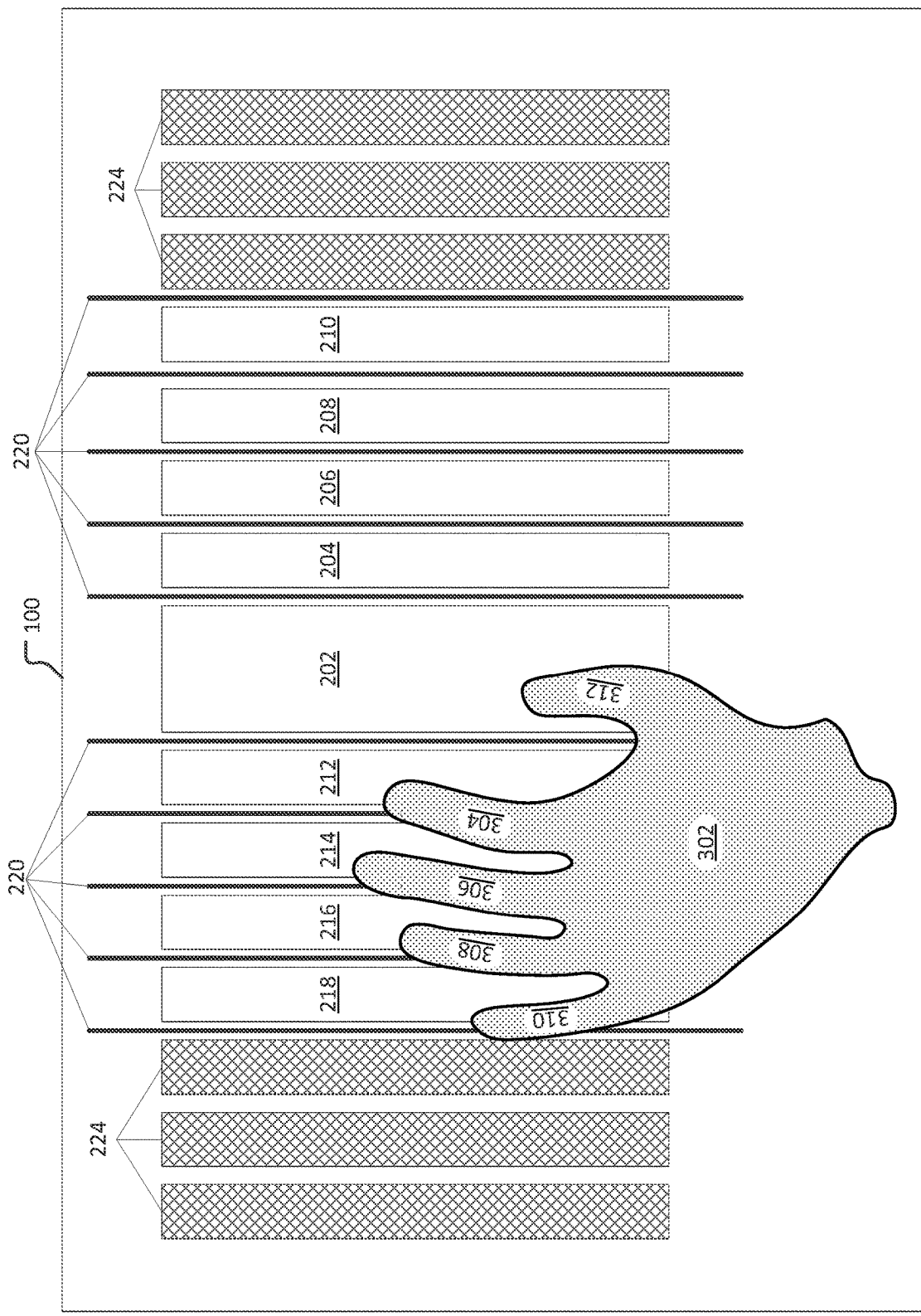

FIG. 4A illustrates a first stage of operation of the device 100 of FIG. 1. An object 302 of a user is positioned over the device 100. The object 302 again may correspond to a user's hand (e.g., left hand). The object 302 may include one or more portions 304, 306, 308, 310 and 312. Each of the one or more portions 304, 306, 308, 310 and 312 may correspond to a finger or thumb on the user's left hand. For example, the portion 304 may correspond to the left index finger, the portion 306 may correspond to the left middle finger, the portion 308 may correspond to the left ring finger, the portion 310 may correspond to the left pinky finger, and the portion 312 may correspond to the left thumb. A user may desire to place the fingers over particular portions of a touchscreen. For example, positioning the portions 304-312 over the regions 212-218 and 202, respectively, may correspond to a left-hand "home" position on a virtual keyboard. As illustrated, many of the portions 304, 306, 308, 310 and 312 are overlapping two or more regions 212, 214, 216, and 218 and the boundary marker(s) 220.

The one or more sensors 144 of FIG. 1 may generate signals for each of the portions 304, 306, 308, 310 and 312 relative to the regions 212, 214, 216, 218 and 202, respectively, and provide the signals to the comparator 112 of FIG. 1. The comparator 112 may determine based on the received signals whether each of the portions 304, 306, 308, 310 and 312 are positioned over the corresponding regions 212, 214, 216, and 218 and may determine whether portion 312 is over region 202.

As illustrated in FIG. 4A, the comparator 112 may determine that each of the portions 304, 306, 308, 310 and 312 are overlapping two or more of the regions 212, 214, 216, 218, 224, and 202. The comparator 112 may further determine direction information for one or more of the portions 304, 306, 308, 310, and 312. The direction information may correspond to guidance or commands. For example, the information may be an audible verbal command produced by the at least one output device 130 of FIG. 1 to instruct the user to move the portion 304 to the right or move the entire object 302 to the right. In another example, the direction information may be a plurality of audio tones (e.g., beeps) with the number or intensity or other characteristic of audio tones decreasing as the portion 304 nears the target region 212. In another example, the direction information may be a vibration of the device 100 with the intensity of vibrations decreasing as the portion 304 nears the region 212. In yet another example, the comparator 112 may determine commands for each of the portions 304, 306, 308, 310 and 312 and provide the commands for each of the portions 304, 306, 308, 310 and 312 as described above.

Figure 4B:
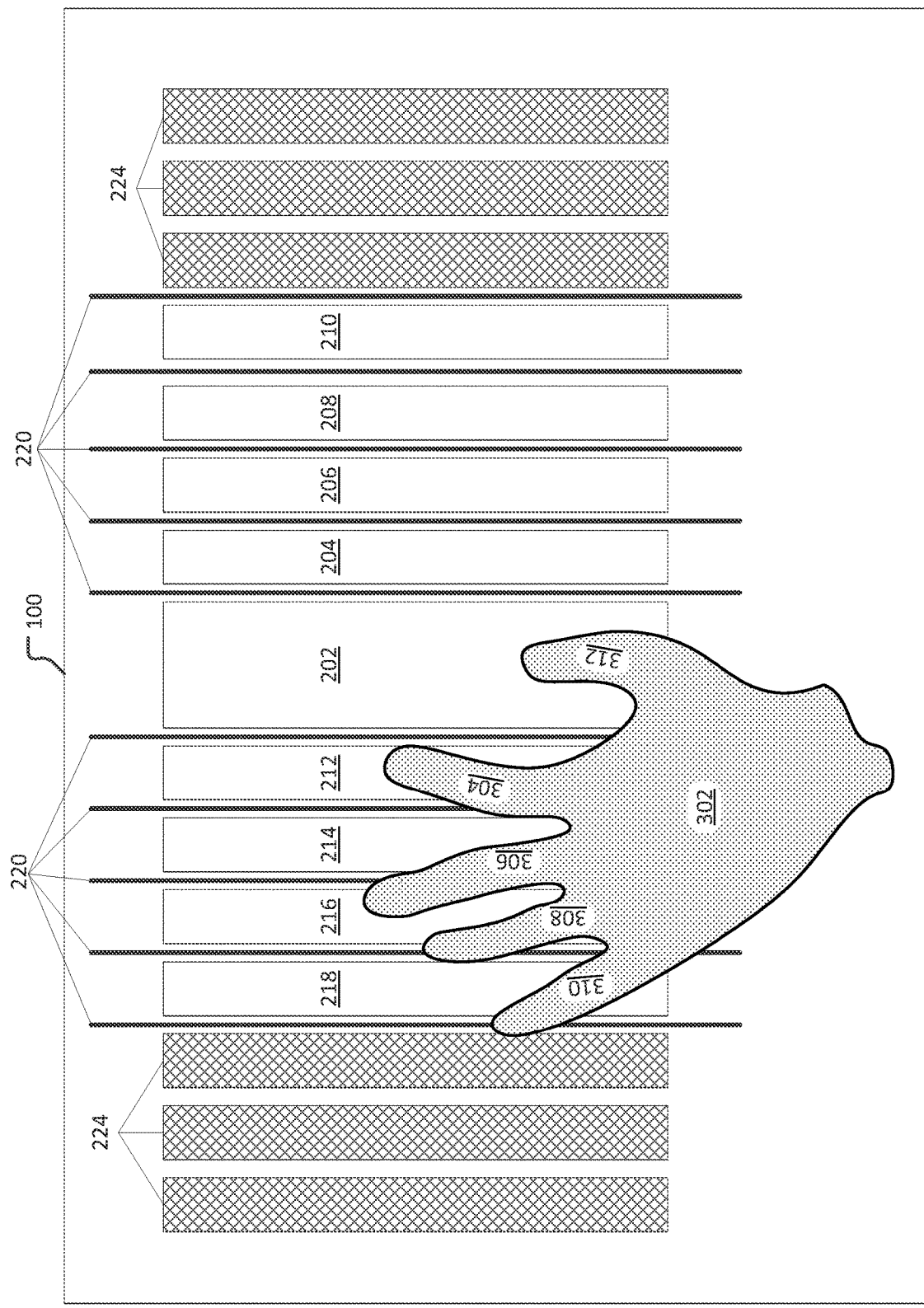
Figure 4C:
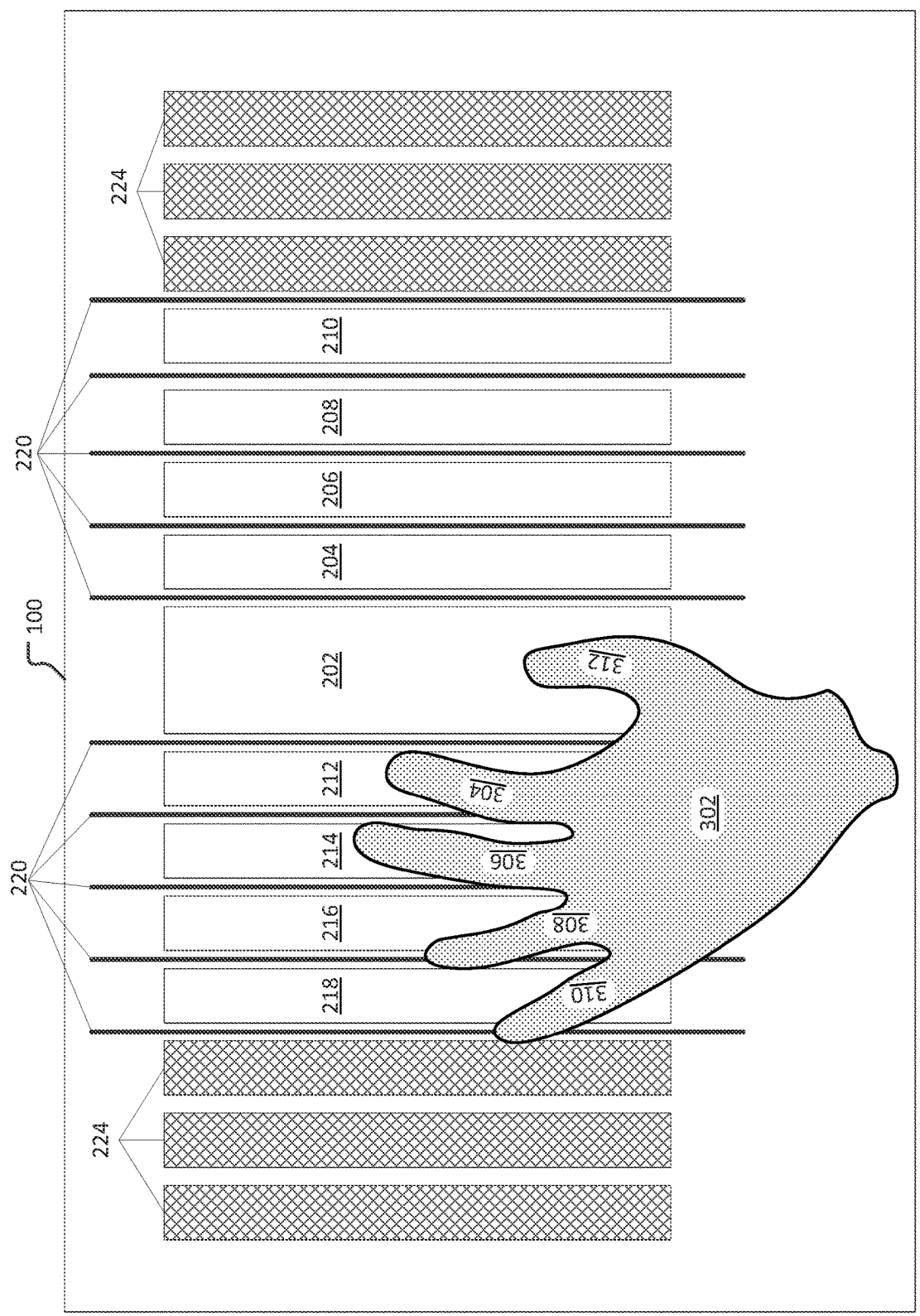
Figure 4D:
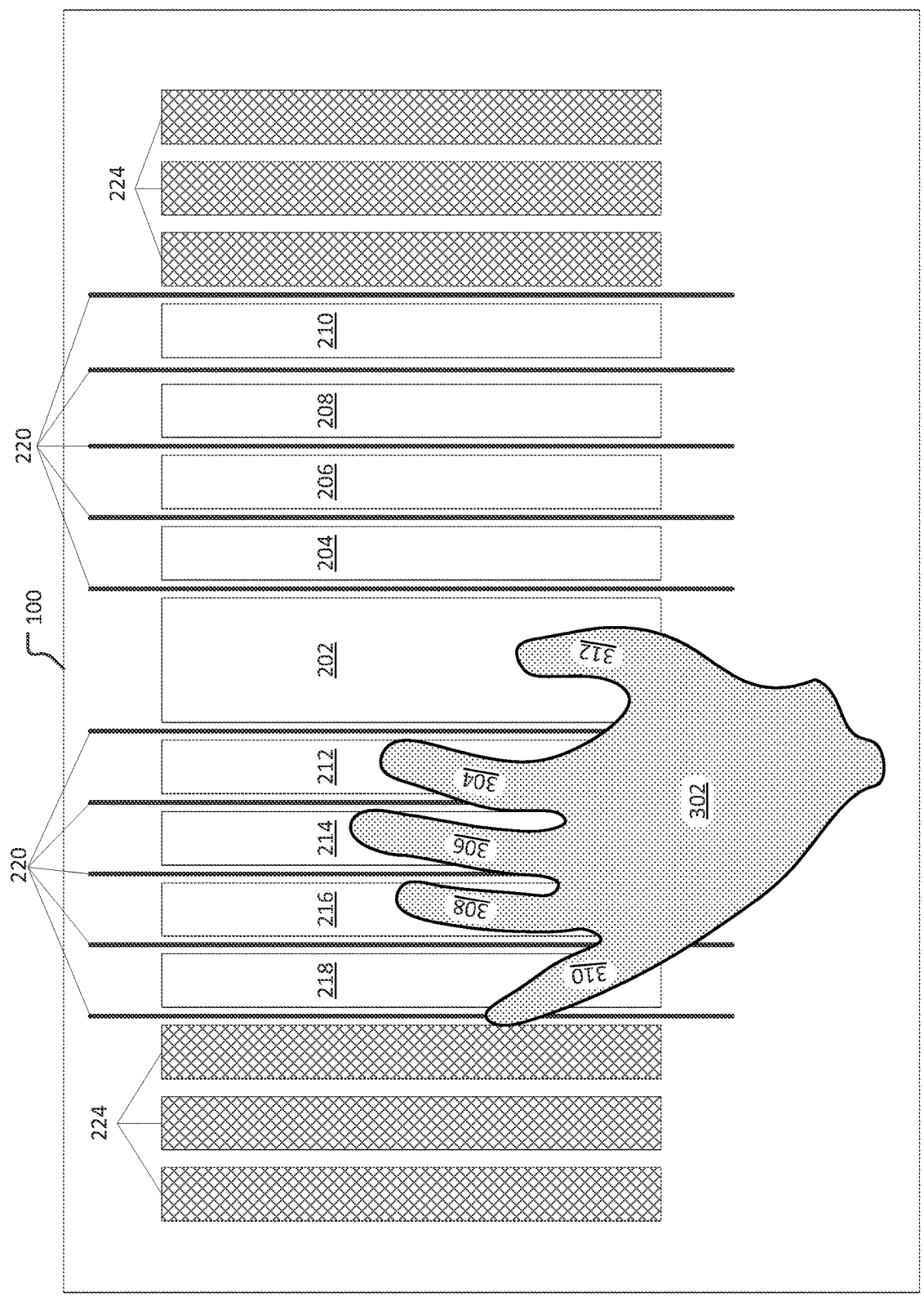

After the portion 304 is positioned over the region 212, the process described with reference to FIG. 4A may be repeated for positioning the portions 306-312 over the designated regions 214-218 and 202 as shown in FIGS. 4B-4D. In an alternative methodology, positioning may be performed by receiving command in relation to a position of the entire object 302 or hand. In such case, the comparator 112 may determine an overall position for the object 302 based on detection of contact points for each of the portions 304, 306, 308, 310 and 312. If the portions 304-312 are overlapping any two or more of the regions 212, 214, 216, 218, 224, and 202, the comparator 112 further determines direction information for the object 302. The device 100 continues to provide feedback until proper positioning of the portions 304-312 is sufficient enough. Further, in this scenario, the positioning may be augmented by having the device compute and render regions 202-218 at different sizes (e.g., widths) until all portions 304-312 (e.g., fingers) have their own respective region 202 and 212-218.

FIG. 4B illustrates a second stage in which the first portion 304 has been placed over region 212 and the second portion 306 is being moved toward region 214. In FIG. 4B, portions 306-310 are over two or more regions 214, 216, 218, 224 and boundary markers 220.

FIG. 4C illustrates a third stage in which the first portion 304 has been placed over region 212 and the second portion 306 has been placed over region 214. The third portion 308 is being moved toward region 216. In FIG. 4C, portions 308-310 are over two or more regions 216, 218, 224 and boundary markers 220.

FIG. 4D illustrates a fourth stage in which the first portion 304 has been placed over region 212, the second portion 306 has been placed over region 214, and the third portion 308 has been placed over region 216. The fourth portion 310 is being moved toward region 218. In FIG. 4D, portion 310 is over two or more regions 218, 224 and boundary markers 220.

Figure 4E:
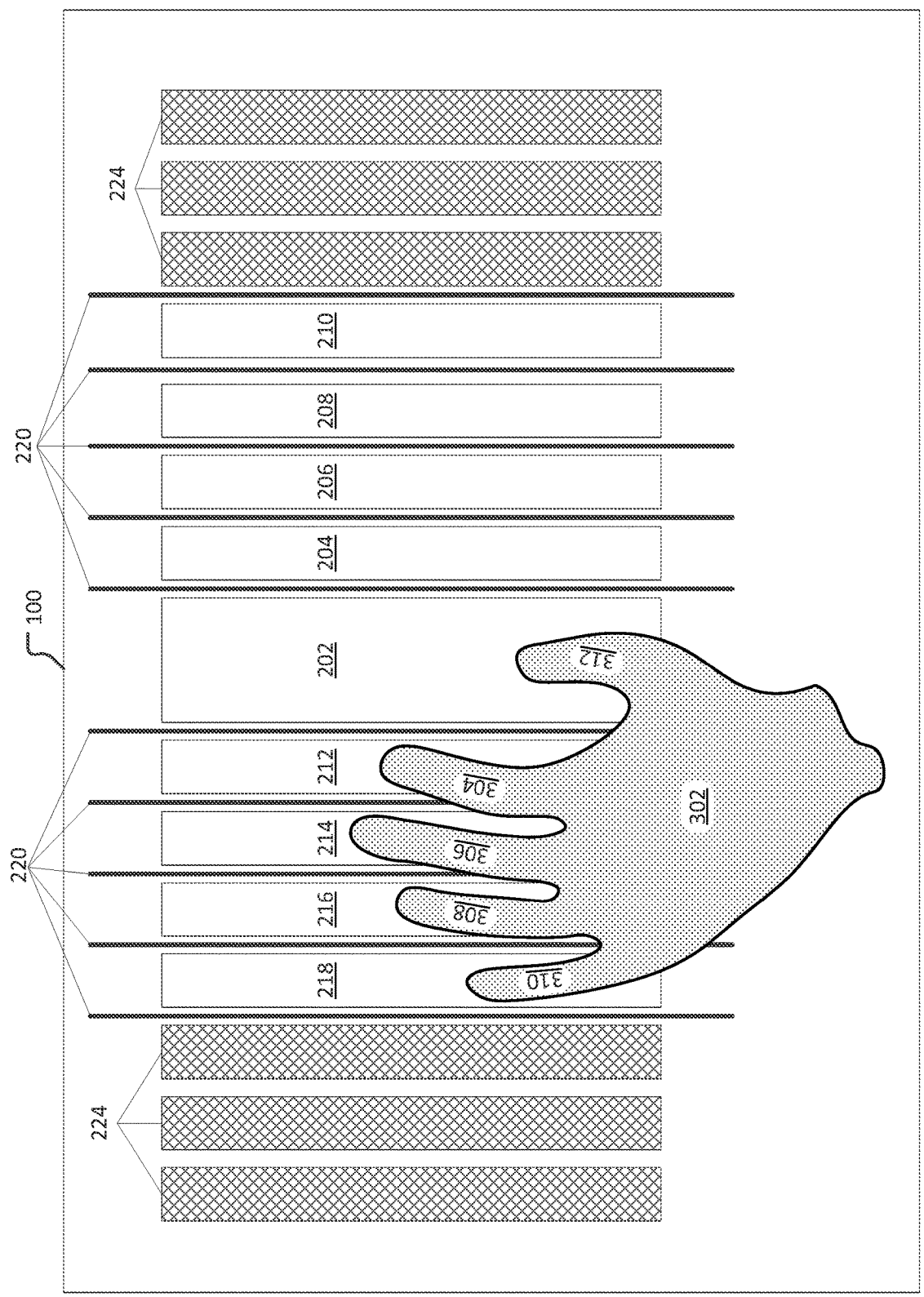

FIG. 4E illustrates another stage of operation of the device 100 of FIG. 1. The comparator 112 of FIG. 1, may determine that the portions 304-312 are correctly positioned over the regions 212-218 and 202, respectively. As described above, the comparator 112 of FIG. 1, may provide to the output device 130 of FIG. 1 commands that indicate to the user that the portions 304-312 are positioned over the regions 212-218 and 202. After the portions 304-312 are positioned, the process described with reference to FIG. 4A may be repeated for positioning the portions 322-330 over the regions 204-210 and 202 as shown in FIGS. 4F-4I. The portions 322-330 correspond to the fingers and thumb of a user's right hand.

Figure 4G:
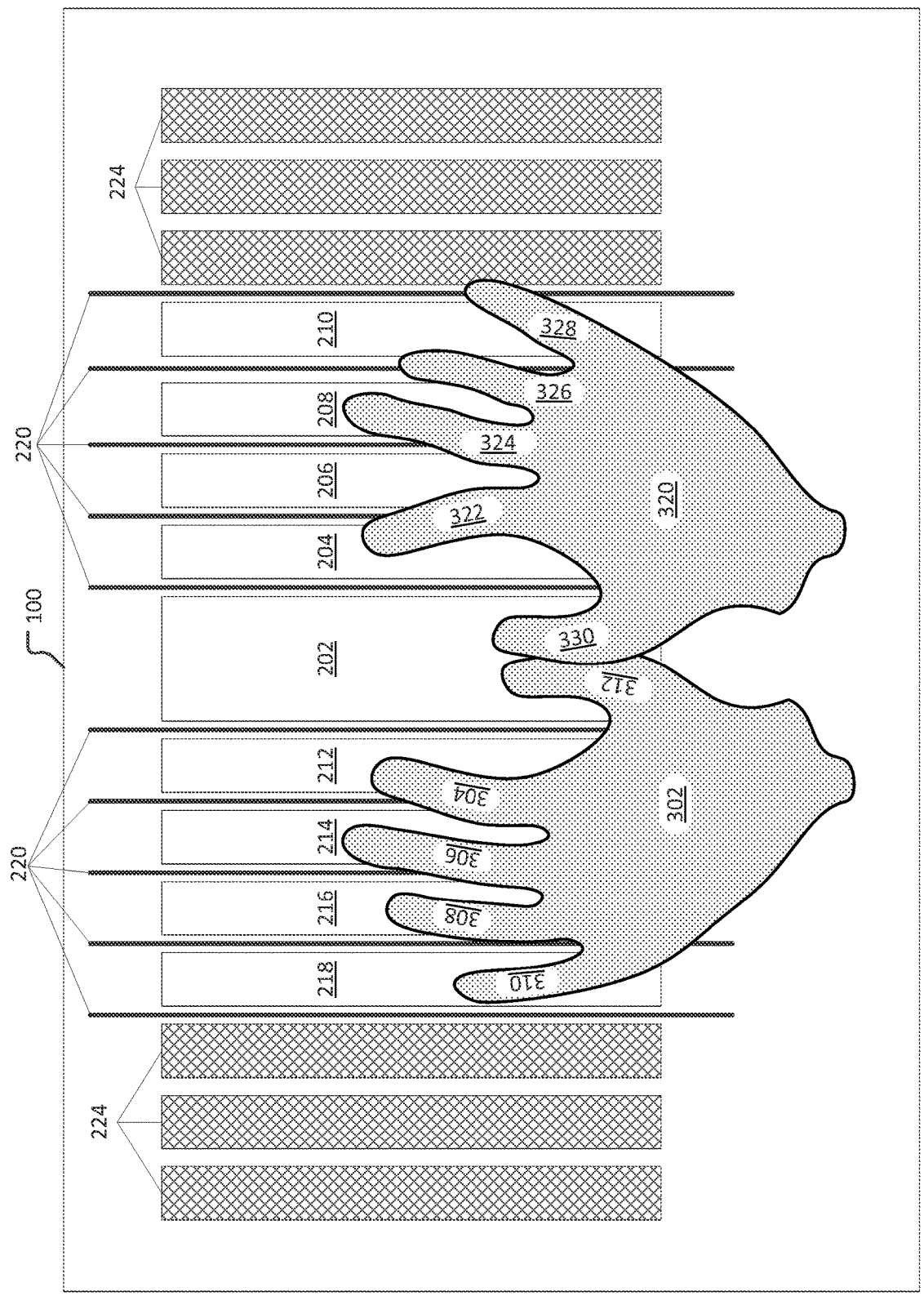

FIG. 4F illustrates another stage of operation of the device 100 of FIG. 1 where just object 320 (e.g., right hand) approaches the device 100. FIG. 4G illustrates another stage of operation of the device 100 of FIG. 1 where a first object 302 (e.g., left hand) and a second object 320 (e.g., right hand) are proximate to the device 100. The first object 302 has already been moved into place over the regions 212-218 and 202 while only region 322 of the second object 320 has been moved into place over region 204. FIG. 4G also illustrates that a "thumb" or central region 202 for thumbs of a user can be split into two active areas 202A, 202B for respective left and right thumbs of a user. In this way, separate detection may be implemented as desired or as needed, depending on the types of input needed to interact with the device 100.

Figure 4H:
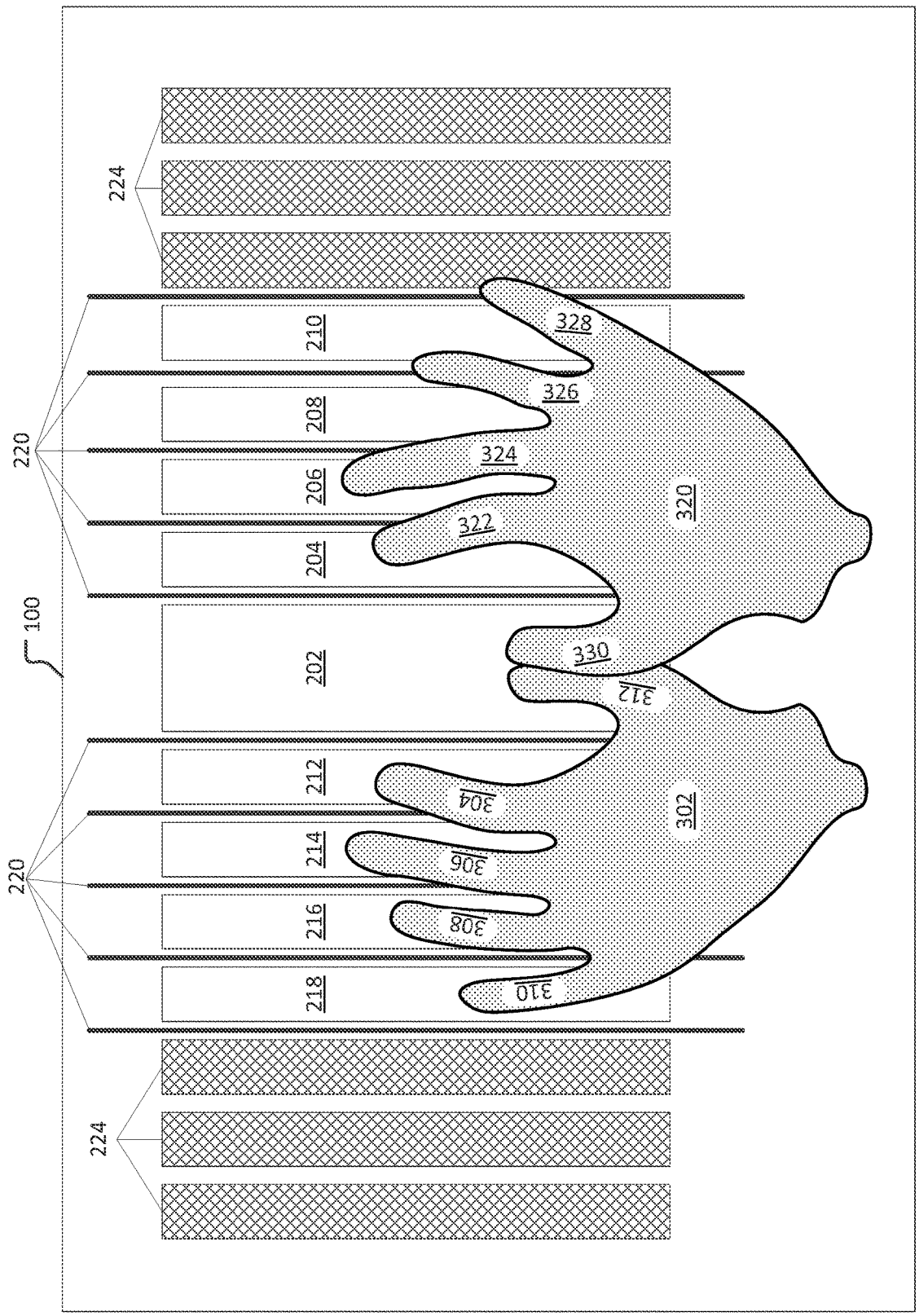

FIG. 4H illustrates another stage of operation of the device 100 of FIG. 1. The comparator 112 of FIG. 1, may determine that the portions 322-324 are correctly positioned over the regions 204 and 206, respectively. The portion 326 is being moved toward region 208. In FIG. 4H, portions 326 and 328 are over two or more regions 208-210 and boundary markers 220.

Figure 4I:
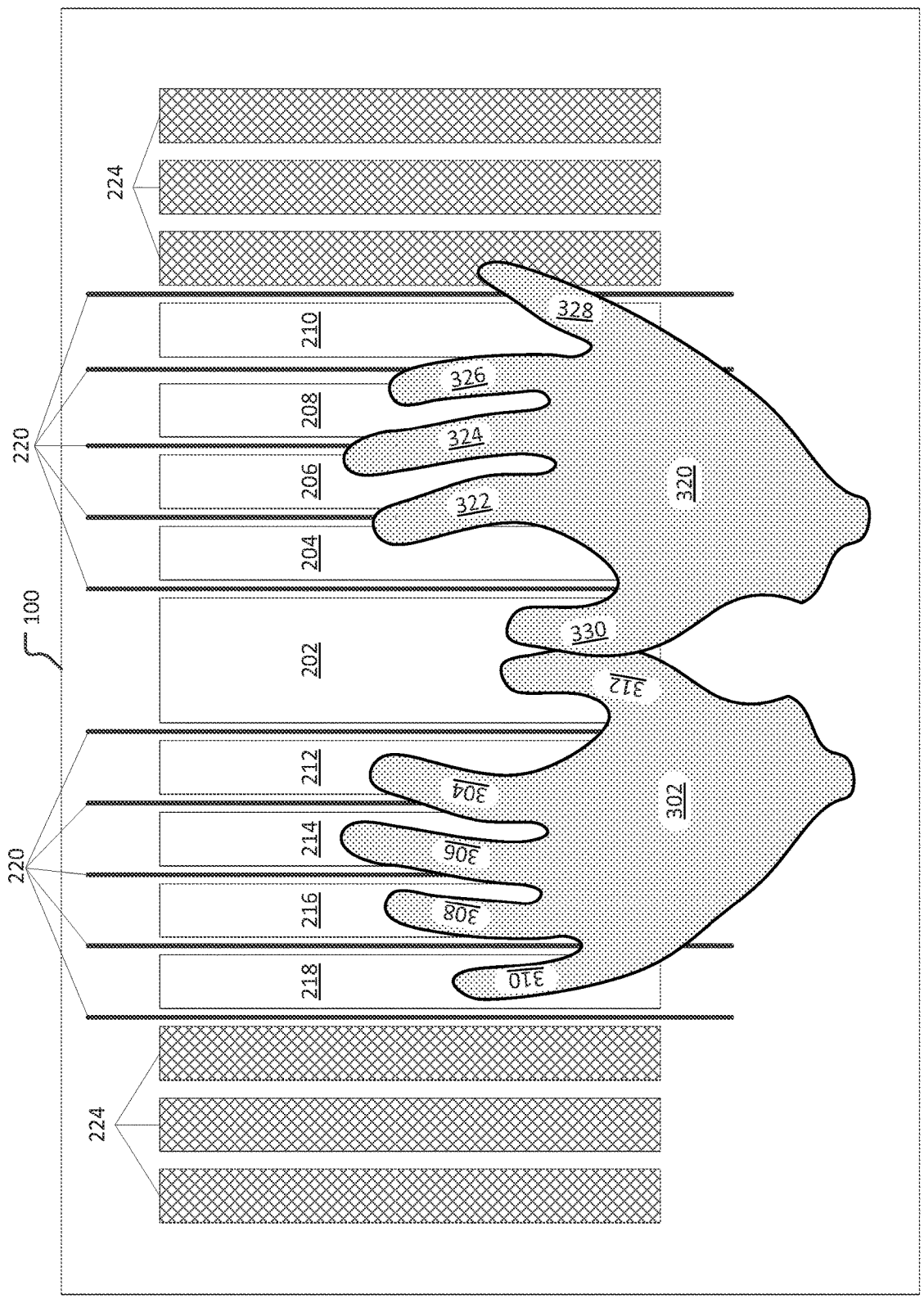

FIG. 4I illustrates another stage of operation of the device 100 of FIG. 1. The comparator 112 of FIG. 1, may determine that the portions 322-326 are correctly positioned over the regions 204-208, respectively. The portion 328 is being moved toward region 210 from right to left. In practice, portion 328 may be moved toward a designated place on the device from any direction. In FIG. 4I, portion 328 is over two or more regions 208-210 and boundary markers 220.

Figure 4J:
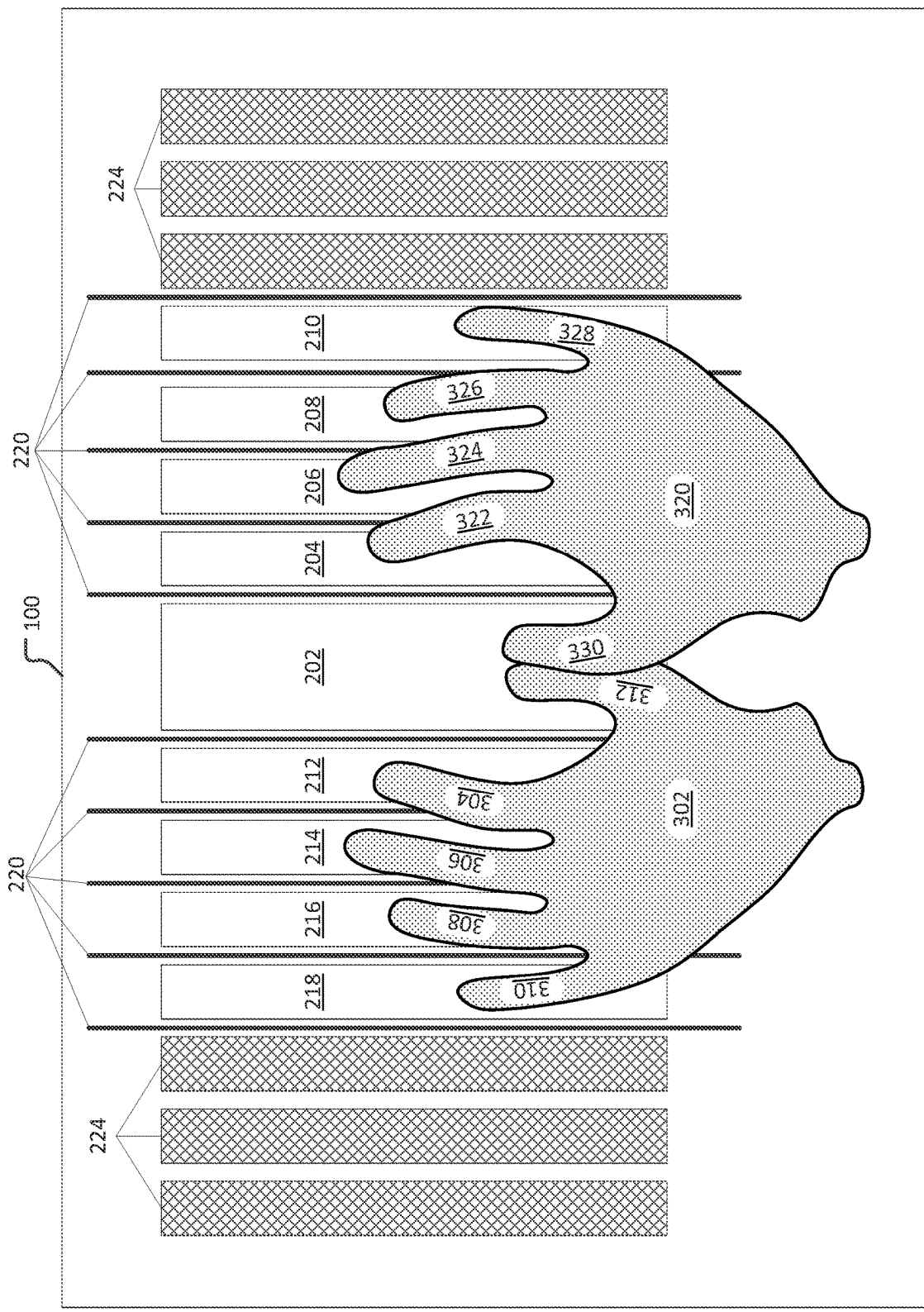

FIG. 4J illustrates another stage of operation of the device 100 of FIG. 1 where all objects 304-312 and 322-330 have already been moved into a designed and desired place over the regions 202-218, respectively. The comparator 112 of FIG. 1, may determine that the portions 304-312 and 322-330 are correctly positioned over the regions 202-218. As described above, the comparator 112 of FIG. 1, may provide to the output device 130 of FIG. 1 commands that indicate to the user that the portions 304-312 and 322-330 are positioned over the regions 202-218. The user has followed the commands or cues provided by the device 100 so as to get all objects 304-312 and 322-330 into place.

While FIGS. 4A-4J illustrated stages for aligning all fingers of both hands, a similar process may be used to align two hands with respect to a keyboard. That is, a single point of an object can be aligned with respect to a particular point of a keyboard. For example, a keyboard is first instantiated on an interface of a device. The keyboard remains in a fixed location on the interface. Next, a signal is continuously provided that guides a left hand into a proper position relative to the keyboard. The signal ceases upon successful alignment of the left hand into place. Alternatively, a second signal indicates successful alignment of the left hand with respect to the keyboard. Next another (third) signal is provided that guides a right hand into proper position relative to the keyboard. The signal ceases upon successful alignment of the right hand into place. Alternatively, a fourth signal indicates successful alignment of the right hand with respect to the keyboard.

Several examples of instantiating a keyboard are described for when a user first seeks to invoke a keyboard for input to the device 100. With reference to FIG. 2, according to a first example, a keyboard is formed by a user placing two hands to the interface 140. The sensors 144 provide input to the comparator 112. Instructions 126 operating on the processor(s) 110 determine a location associated with each hand proximate to the interface 140. A keyboard such as the one with vertical keys as illustrated in FIG. 2 is instantiated on the interface 140 and centered on the interface 140. The key regions 202-218 each have a predetermined size.

According to another example, a keyboard is formed by a user placing two hands to the interface 140. The sensors 144 provide input to the comparator 112. Instructions 126 operating on the processor(s) 110 determine the locations of two objects (e.g., two adjacent fingers, one location associated with each respective hand) with respect to the input area 142. A keyboard is instantiated on the interface 140 if there is enough room for all keys of the keyboard based on a distance between the two objects. The distance between the two objects is used to determine sizes for the respective key regions 202-218 to conform to the distance between the two objects. The locations of the key regions 202-218 are approximately centered on the interface 140 based on the two detected objects. If there is insufficient area for the keyboard on the interface 140, the output device 130 announces an incompatible pair of object detections relative to the device 100. That is, a user has to re-position one or both of the two objects (e.g., hands, fingers). If the initial determination based on the first two detections of objects are successful, an output to the user indicates that the keyboard is instantiated and ready for use. The user lifts her hands from the interface 140 and begins using the keyboard until the keyboard is removed from the interface.

According to another example for invoking a keyboard, a keyboard is instantiated on an input area 142 by a user placing two principal fingers (e.g., index finger and middle finger) of either hand to the interface 140 sufficiently proximate to a central region on the interface 140 corresponding to the central key regions 202-206, 212-214 on the input area 142 of the device 100. The sensors 144 provide input to the comparator 112. Instructions 126 operating on the processor(s) 110 determines a distance between the locations. The instructions 126 determine a size of each key region 202-218 for a keyboard based on the determined distance. The instructions 126 operating on the processor(s) 110 also determine whether there is enough room to instantiate a keyboard based on a user-preferred keyboard size stored with a user profile and the determined distance. If the determinations are successful, a keyboard such as the keyboard having vertical key regions 202-218 as illustrated in FIG. 2 is instantiated on the interface 140.

In an illustrative sequence of steps, a user places an index finger and a middle finger of a left hand on the interface 140. A first detected location of the index finger and a second detected location of the middle finger are determined. A distance between the two locations is determined and compared against a range of acceptable values associated with a keyboard profile for the user. If the comparison is successfully, key regions 212-214—along with all key regions 202-210, 216-218—are instantiated a same distance apart as the detected distance between the initial two sensed locations. The keys are part of a Braille keyboard such as the one shown in FIG. 2. The keyboard is instantiated at a centered region on the interface 140 as long as the first two touches are within an allowable distance from each other. If the touches or locations are too far apart (e.g., spread too far apart or too close together), the output device 130 generates and broadcasts a first signal indicating that an incompatible touch has occurred to the device 100 and that a keyboard has not been instantiated. If the two touches are successful, a second signal indicating that a compatible touch has occurred to the device 100 and that a keyboard has been instantiated on the interface 140. Upon successful invocation, the user lifts her fingers from the interface 140 and begins using the keyboard until the keyboard is removed from the interface 140.

According to yet another example, a keyboard is instantiated by a user placing four fingers of either hand to the interface 140 and at any location on the interface 140. The sensors 144 provide input to the comparator 112. Instructions 126 operating on the processor(s) 110 determines an average distance between adjacent pairs of locations (i.e., three pairwise comparisons between the four fingers). Instructions 126 operating on the processor(s) 110 instantiate a keyboard, having keys of a predetermined width, in a fixed position centered in the middle of the interface 140. The location of the key regions 202-218 with respect to one another are based on the distances between the pairs of the four detected locations. That is, if the locations are successfully identified and each of the distances between successive finger-based touches (e.g., detected locations) are within pre-determined norms, a keyboard such as a keyboard having vertical key regions 202-218 such as the ones illustrated in FIG. 2 are instantiated on the interface 140. The key regions 202-218 are instantiated a distance apart that is the average of the detected distances between successive locations. The keyboard is located at a typical (e.g., centered) region for the keyboard on the interface 140 as long as the first four touches corresponding to the four fingers are successfully detected by the device 100. If the touches or locations violate expected norms for four fingers (e.g., fingers are spread across too many key regions 202-218 of the interface 140, fingers are too close together, fingers are too far apart, only three objects are detected), the output device 130 generates and signals that an incompatible touch has occurred to the device 100. Upon successful detection of four viable touches, an output to the user indicates that the keyboard is instantiated and ready for use. The user lifts her four fingers from the interface 140 and then begins using the keyboard regions 202-218 until the keyboard is removed from the interface 140.

Alternatively, in this example, instead of pre-programmed widths, keys are provided based on detected finger sizes. That is, key widths are based on widths of the respective touches. If the touches are successful, key regions 202-218 are instantiated across the interface 140 at a pre-determined location (e.g., centered on the interface 140). Once distances between fingers are detected, and once key sizes are determined, the user is then expected to move her hands to approximately the determined positions corresponding to the key regions 202-218 of the keyboard on the device 100. The user is then expected to hit one or more key regions 202-218 to authenticate that her fingers are properly aligned with the key regions 202-218. If successful, authentication keystrokes trigger output (e.g., audible signal) from the output device 130 to provide feedback that keystrokes are aligning properly with keys 202-218. In a specific embodiment indicating proper alignment, according to a pre-programmed set of instructions, a user invokes the keyboard with four touches. The device 100 via the output device 130 announces that the keyboard is invoked at a central location on the interface 140. The user is then expected to try keys 204, 206, 212 and 214 in order confirming that both the right hand and left hand, respectively, are properly positioned on the keyboard on the interface 140. The user is then free to use the keyboard as desired until the keyboard is removed from the interface. In use, the keyboard responds as typical by causing the processor(s) 110 to generate one character per keystroke.

Figure 5:
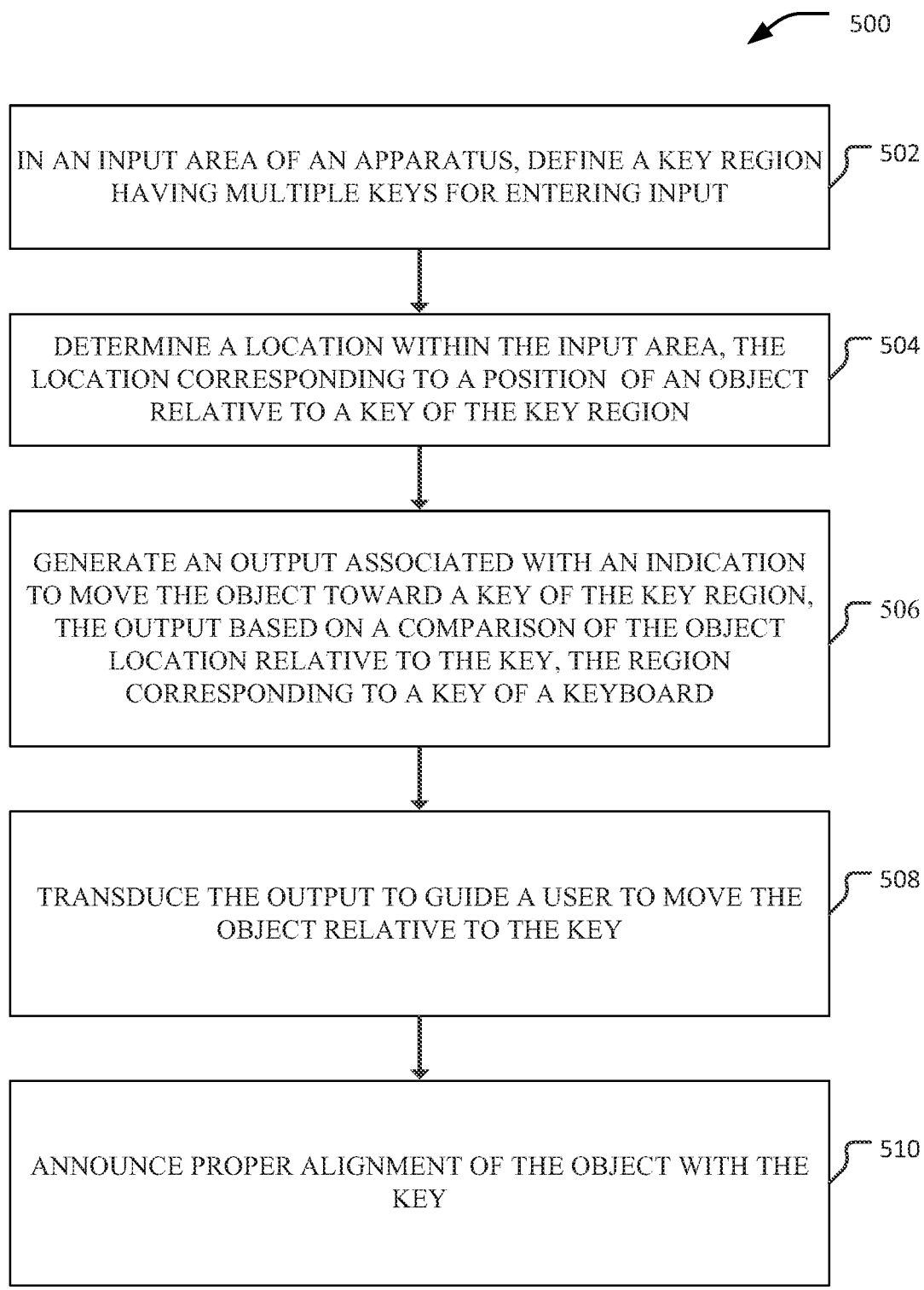
FIG. 5 is a flowchart of an illustrative example of a method of aligning an object with respect to a region of a touchscreen of the device of FIG. 1.

FIG. 5 is a flowchart of an illustrative example of a method 500 of aligning an object with respect to a region of a touchscreen of the device of FIG. 1. In the particular example, FIG. 5 illustrates establishment and use of a braille keyboard on the device 100.

The method 500 includes, at 502, in an input area of an apparatus, defining a key region having multiple keys for entering input. The input area may be an interface 140 such as on the device 100 of FIG. 1. The keys and their arrangement on the interface 140 may take any of the forms described elsewhere herein.

In 504, the method 500 includes determining a location within the input area, the location corresponding to a position of an object relative to a key of the key region. For example, the object may be portion 302 or portion 304 in FIGS. 3A-3D.

In 506, the method 500 includes generating an output associated with an indication to move the object toward a key of the key region, the output based on a comparison of the object location relative to the key, the region corresponding to a key of a keyboard.

In 508, the method 500 includes transducing an output to guide a user to move the object relative to the key. As an example, the device 100 emits a sound or vibration such that a user is guided to a key (e.g., key 212 of FIG. 4A-4J) without looking at the input area or interface 140 of the device 100.

In 510, the method 500 includes announcing proper alignment of the object with the key. The key may take the form of one of the keys of a keyboard or key region as described herein. For example, a sound or vibration ceases upon successful re-alignment with the key on the interface 140. Or, a first sound from transducing in 508 guides a user and a second sound at 510 announces proper alignment of the object relative to the interface 140.

In summary, FIG. 5 is an illustrated example of a method 500 of aligning an object with a key of a keyboard on an interface such as a touchscreen. Upon detecting a location such as by detecting key presses or presence of object near the interface, the device provides cues for keeping a user's hands in the correct locations. The user is able to continue to use the keyboard without being able to see the keys or other visual markers on the touchscreen. In the particular example, method 500 of FIG. 5 could refer to use of a braille keyboard on a touchscreen of a device such as device 100 illustrated in FIG. 1 and such as the keyboard illustrated in FIG. 2.

Figure 6:
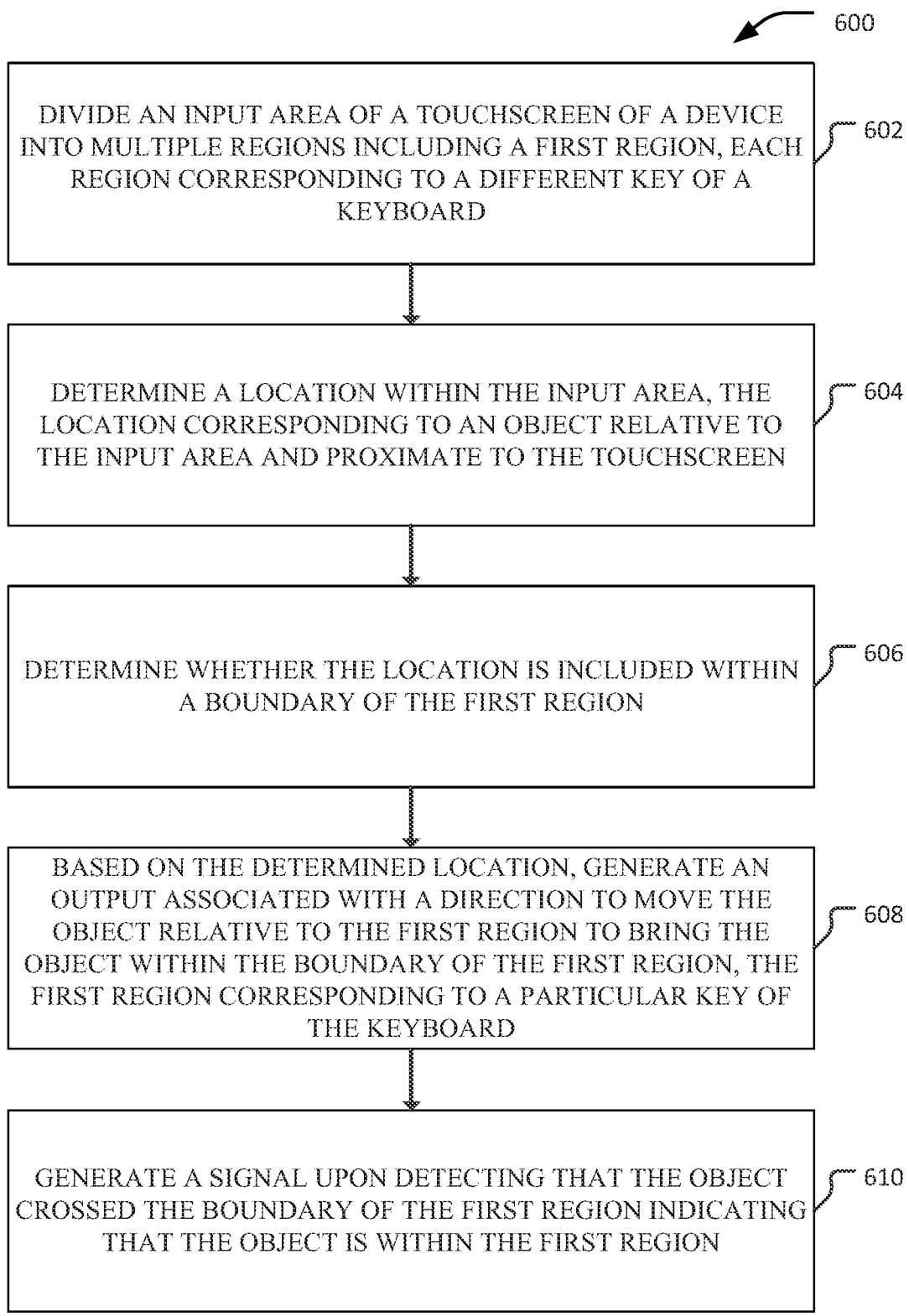
FIG. 6 is a flowchart of another illustrative example of a method of aligning an object with respect to a region of a touchscreen of the device of FIG. 1.

FIG. 6 is a flowchart 600 of another illustrative example of a method of aligning an object with respect to a region of a touchscreen of a device. At 602, the method 600 includes dividing an input area of a touchscreen of a device into multiple regions including a first region, each region corresponding to a different key of a keyboard. An example of a keyboard is a computer keyboard or the keyboard shown in FIG. 2.

At 604, the method 600 includes determining a location within the input area, the location corresponding to an object relative to the input area and proximate to the touchscreen.

At 606, the method 600 includes determining whether the location is included within a boundary of the first region. The first region may be a key such as the key 202 of FIG. 2.

At 608, the method also includes based on the determined location, generating an output associated with a direction to move the object relative to the first region to bring the object within the boundary of the first region, the first region corresponding to a particular key of the keyboard. According to an example, the first region corresponds to a particular key of the keyboard formed in step 602. The output may include a sound, vibration, tone, verbal command or directional information to guide a user to move the object to the key of the keyboard.

At 610, the method includes generating a signal upon detecting that the object crossed the boundary of the first region indicating that the object is within the first region.

The steps of the method 600 may be repeated for each object such as for each finger of a hand corresponding to four or five fingers of a hand relative to a corresponding number of keys. The keys may be a subset of all keys of a keyboard. Alternatively, depending on the keyboard, the number of objects may correspond to the same number of keys in the keyboard such as the Braille keyboard illustrated in FIG. 2.

Figure 7:
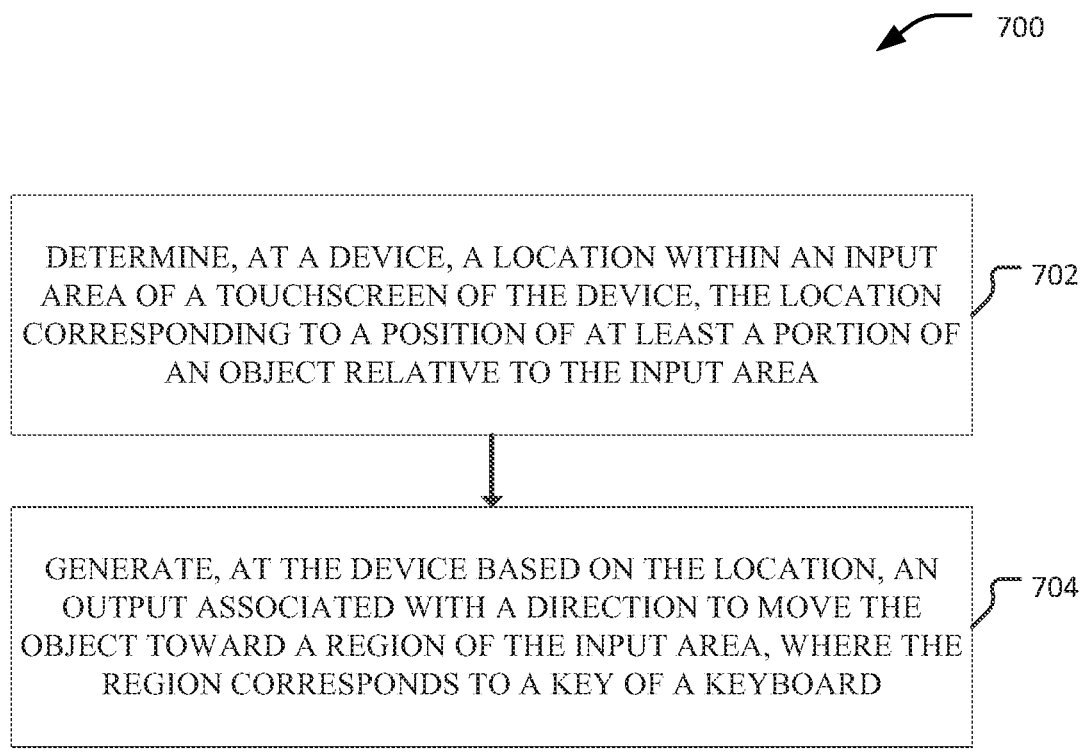
FIG. 7 is a flowchart of an illustrative example of a method of providing feedback associated with a designated input area (e.g., key of a virtual keyboard) of a touchscreen.

FIG. 7 is a flowchart of an illustrative example of a method 700 of aligning an object with respect to a region of a touchscreen after a keyboard has been instantiated on an interface. The method 700 enables an existing touchscreen to be used as a Braille keyboard. The method 700 enables detection of a finger position and provides output feedback to assist a visually impaired user in maintaining alignment of his hands over touchscreen "keys" as conventional touchscreens do not have raised keys like a conventional Braille keyboard.

At 702, the method 700 includes determining, at a device, a location within an input area of a touchscreen of the device, the location corresponding to a position of at least a portion of an object relative to the input area. The location corresponds to a position of at least a portion of an object relative to the input area.

At 704, the method 700 also includes generating, at the device based on the location, an output associated with a direction where the output includes directions to move the object toward a region of the input area, where the region corresponds to a key of a keyboard. In this instance, an "output" that is associated with a direction may include an audible alert of a certain tone or frequency, or other characteristic. Other outputs are possible including pre-recorded audio segments such as verbal directions in a first language. That is, directions as used herein broadly includes any signal or feedback with which a user may adjust his hand or finger with respect to the interface 140 and keyboard instantiated thereon.

Generally, in view of FIGS. 4A-4J, the one or more sensors 144 of FIG. 1 may generate signals for each of the portions 304, 306, 308, 310, 312, 322, 324, 326, 328 and 330 relative to the regions 204, 206, 208, 210, 212, 214, 216, and 218 and provide the signals to the comparator 112 of FIG. 1. The comparator 112 may determine whether each of the portions 304, 306, 308, 310, 312, 322, 324, 326, 328 and 330 are within the corresponding regions 202, 204, 206, 208, 210, 212, 214, 216, and 218. Further, the comparator 112 of FIG. 1, may determine direction information of at least one of the portions 304, 306, 308, 310, 312, 322, 324, 326, 328 and 330. As illustrated in FIGS. 3A-3J, the comparator 112 of FIG. 1 may determine which of the portions 304, 306, 308, 310, 312, 322, 324, 326, 328 and 330 are overlapping two or more regions 202, 204, 206, 208, 210, 212, 214, 216, 218, and 224.

Returning to FIG. 7, in another example, prior to determining the location, the method 700 may include dividing the input area into multiple regions, where each region of the multiple regions corresponds to a different key of a keyboard. For example, the input area 142 may be divided into multiple regions, as illustrated in FIG. 2. One or more of the regions 202, 204, 206, 208, 210, 212, 214, 216, and 218 of FIG. 2 may correspond to a key on a keyboard. For example, when the keyboard is a Braille keyboard, the region 202 may correspond to a space key. The region 212 may correspond to a dot 1 key. The region 214 may correspond to a dot 2 key. The region 216 corresponds to a dot 3 key. The region 204 may correspond to a dot 4 key. The region 206 may correspond to a dot 5 key. The region 208 may correspond to a dot 6 key. The region 218 may correspond to line spacer key. The region 210 may correspond to a backspace key. The device 100 may be configured to provide an output indicating that a portion of an object is not over one of the regions 202, 204, 206, 208, 210, 212, 214, 216, and 218 corresponding to one of the keys. Further, each of the regions 202, 204, 206, 208, 210, 212, 214, 216, and 218 may correspond to the columns 226 or the rows 228 based on the orientation of the device 100.

In another example, the method 700 may include determining whether the location is included within the region. For example, the comparator 112 of FIG. 1 may determine whether at least one of the portions 304, 306, 308, 310 and 312 as shown in FIGS. 4A-4J are within the corresponding regions 212, 214, 216, 218 and 202.

In another example, the method 700 further includes, in response to the location being outside of the region, determining the direction to move the object. For example, the comparator 112 of FIG. 1 may determine direction information of at least one of the portions 304, 306, 308, 310 and 312. As illustrated in FIG. 4A, the comparator 112 of FIG. 1 may determine that the portion 304 is to be moved to the right from the position illustrated.

In another example, prior to determining the direction information to move the object, the method 700 may include receiving sensor data (e.g., signals) indicative of the position of the object relative to the input area. Further, the method 700 may include comparing the sensor data to a threshold, where the location is determined by the comparator based on the sensor data satisfying a threshold. The threshold may correspond to an x, y region on the input area 142, where the x, y, region is associated with region(s) 202, 204, 206, 208, 210, 212, 214, 216, and 218 of FIG. 2. For example, the comparator 112 of FIG. 1, may be configured to receive the sensor data (e.g., signals) from the one or more sensors 144. The comparator 112 may be further configured to perform a comparison based on the received signals to determine a position of the object to the regions of the input area 142. The comparator 112 may determine the position for at least one of the portions 304, 306, 308, 310, 312, 322, 324, 326, 328 and 330 of the object 302 or object 320 in relation to the regions 202, 204, 206, 208, 210, 212, 214, 216, and 218 of FIGS. 4A-4J. The comparator 112 may be further configured to perform the comparison between a value associated with the sensor data (e.g., signals) of the object in relation to the threshold.

As indicated, the method 700 further includes generating, at the device based on the location, an output associated with a direction where the output includes the object toward a region of the input area where the region corresponds to a key of a keyboard, at 704. For example, the at least one output device 130 of FIG. 1 may, in some examples, include a speaker 134 configured to generate audio output. The audio output may be associated with a command or directional information to move the object (e.g., user's hand, user's finger). For example, the command to move the object may include an audible verbal command to move the object left or right. As another example, the directional information to move the object may include an audible noise such as a beep. In another example, the directional information to move the object may include an audible verbal sound that the object is "oriented" over the corresponding region for the object. Alternatively, or in addition, the at least one output device 130 may include a vibration device 136 configured to generate a vibration output. The vibration output may be associated within an indication to move the object and at least cause a portion of the vibration device 132 to vibrate.

In another example, the method 700 may further include determining a second location within the input area. The second location may correspond to a second position of a second object relative to the input area. For example, in view of FIGS. 4A-4J, the one or more sensors 144 of FIG. 1 may generate signals for each of the portions 304, 306, 308, 310 and 312 relative to the regions 212, 214, 216, 218 and 202, and provide the signals to the comparator 112 of FIG. 1. The comparator 112 may determine based on the received signals whether each of the portions 304, 306, 308, 310 and 312 are positioned over the corresponding regions 212, 214, 216, 218 and 202. Further, the comparator 112 may further determine direction information for the portion(s) 304-312 and 322-330. The direction information may correspond to intelligible verbal commands. For example, the directional information may be an audible verbal sound outputted by the at least one output device 130 of FIG. 1 to instruct the user to move the portion(s) 304-312 and 322-330 to the right or to the left. Other examples of directional information may additionally include the examples described above.

In another example, the method 700 may further include, generating a second output associated with a second direction to move a second object toward a second region of the input area. The second region may correspond to a second key of the keyboard. For example, after the portion 304 is positioned over the region 212, the process described with reference to FIG. 4A may be repeated for correctly positioning the portions 306-312 over the regions 214-218 and 202 and for correctly positioning the portions 322-330 over the regions 204-210 and 202 as shown in FIGS. 4B-4D and FIGS. 4F-4I, respectively.

In another example, the method 700 may further include determining an orientation of the device, and based on the orientation, selectively activating one or more of the columns of sensors or one or more rows of sensors for sensing associated with the input area. For example, as illustrated in callout 146 of FIG. 1, the rows 152 are illustrated with shading and the columns 148 are shaded using a dot pastern. The columns 148 and the rows 152 may include the one or more sensors 144 configured to be positioned within the device 100 to be aligned with the columns 148 and the rows 152. For example, when the orientation of the device 100 is in "portrait" mode, the one or more sensors 144 aligned with rows 152 may be selectively activated for sensing at least a portion of the object and the one or more sensors 144 aligned with the columns 148 may be selectively deactivated for sensing. In another example, when the orientation of the device 100 is in "landscape" mode, the one or more sensors 144 aligned with the rows 152 may be selectively deactivated for sensing and the one or more sensors 144 aligned with the columns 148 may be selectively activated for sensing at least the portion of the object.

In another example, the method 700 may further include determining a match between the region and the position of at least the portion of the object, and generating a second output associated with an indication that the position of at least the portion of the object is aligned with the region. For example, FIG. 4J illustrates another stage of operation of the device 100 of FIG. 1. The comparator 112 of FIG. 1, may determine that the portions 304-312 and 322-330 are correctly positioned over the regions 202-218. As described above, the comparator 112 of FIG. 1, may provide to the output device 130 of FIG. 1 information that indicates to the user that the portions 304-312 and 322-330 are positioned over the regions 202-218.

In another example, the method 700 may further include, initiating a presentation of a keyboard via the touchscreen. For example, the memory 120 of FIG. 1, may include the keyboard layout data 122. The keyboard layout data 122 may include data corresponding to one or more keyboard configurations. The keyboard configurations may include a Braille keyboard.

In another example, the method 700 may further include determining a separation distance between a first portion of the object and a second portion of the object and based on the separation distance, determining a first size of the region and a second size of a second region. The second region may correspond to a second key of the keyboard. For example, the comparator 112 may be configured to determine a separation distance between the portions 304 and 306 of the object 302. The comparator 112 of FIG. 1, may be configured to receive signals from the one or more sensors 144 and determine a configuration size for the region(s) 202-218 of FIG. 2 based on the separation size. Further, the comparator 112 may be further configured to determine a separation distance between each of the portions 304-312 and 322-330 of FIGS. 4A-4J and a configuration size for each of the regions 202-218.

In another example, the method 700 may further include receiving an identifier of a user of the device and based on the identifier accessing parameters stored at a memory of the device. The parameters may be associated with a layout of keys of the keyboard. For example, the one or more parameters 124 of FIG. 1 may correspond to a user profile. The user profile may instruct the processor 110 to divide the input area 142 into regions 202, 204, 206, 208, 210, 212, 214, 216, and 218 of FIG. 2. The regions 202, 204, 206, 208, 210, 212, 214, 216, and 218 of FIG. 2 may correspond to keys on a Braille keyboard, with each of the regions being a specific shape or size based on the user profile. For example, the user profile may indicate that the user has large fingers and that the specific shape for each region may be larger and may have a larger space between each of the regions. Another example, the user profile may indicate that the user is missing finger(s). In this example, the device 100 determines positions for that particular number of fingers. In another example, the user profile may instruct the processor 110 to divide the input area into a conventional keyboard rather than the keyboard shown in FIG. 2.

As described herein, the methods 500, 600 and 700 illustrated in FIGS. 5-7 enable a visually impaired user to align their hands (e.g., objects) over a virtual keyboard on an electrical device and receive information associated with direction information to move each finger or hand of the user and to divide the regions left of the thumb or central region into four regions and the area right of the common thumb position into another four regions to form nine virtual keys (e.g., virtual keyboard) on the device. For example, the aligning of the fingers of a user over the virtual keyboard using the methods 500, 600 and 700 may correspond to some or all of the mechanisms described and illustrated in FIGS. 3A-3D and 4A-4J and elsewhere herein.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described implementations. The terminology used herein was chosen to best explain the principles of the disclosure, the practical application or technical improvement over technologies found in the marketplace, or to enable others of ordinary skill in the art to understand the aspects disclosed herein.

What is claimed is:

1. A computer-implemented method to provide a virtual Braille keyboard, the computer-implemented method comprising:

receiving an identifier of a user of a device;

accessing, based on the identifier, a layout of Braille keys that is specific to the user, the layout having associated parameters including a count of fingers of the user;

dividing an input area of a touchscreen of the device into multiple regions including a first region, wherein each region of the multiple regions corresponds to a different virtual Braille key of a Braille keyboard based on the layout;

determining an orientation of the device relative to gravity;

selectively activating, based on the orientation, one or more columns of sensors or one or more rows of sensors associated with the input area;

presenting the Braille keyboard via the touchscreen;

generating, by the device, sensor data indicative of a location of an object relative to the input area;

determining whether the location of the object is included within a first boundary of the first region, by comparing the sensor data to a threshold, wherein the location is determined based on the sensor data satisfying the threshold;

based on the determined location, generating, by the device, an audible verbal command associated with a direction to move the object towards the first region of the input area, wherein the first region corresponds to a particular virtual Braille key of the Braille keyboard, the audible verbal command ceasing when the object is within the first region;

generating, by the device, sensor data over a time period indicative of the location of the object relative to the input area over the time period;

determining a rate of travel of the object with respect to a second boundary of the first region; and generating a second audible verbal command indicating a direction of travel of the object indicating a potential travel of the object out of the second boundary of the first region.

2. The computer-implemented method of claim 1, further comprising:

detecting the object crossing the boundary of the first region; and generating an indication that the location of the object is aligned with the first region.

3. The computer-implemented method of claim 1, further comprising:
    determining a separation distance between a first portion of the object and a second portion of the object relative to the touchscreen; and
    determining, based on the separation distance, a first size of the first region and a second size of a second region, wherein the second region corresponds to a second virtual Braille key of the Braille keyboard.

4. A non-transitory computer-readable medium containing instructions executable to perform an operation to provide a virtual Braille keyboard, the operation comprising:
    receiving an identifier of a user of a device;
    accessing, based on the identifier, a layout of Braille keys that is specific to the user, the layout having associated parameters including a count of fingers of the user;
    dividing an input area of a touchscreen of the device into multiple regions including a first region, wherein each region of the multiple regions corresponds to a different virtual Braille key of a Braille keyboard based on the layout;
    determining an orientation of the device relative to gravity;
    selectively activating, based on the orientation, one or more columns of sensors or one or more rows of sensors associated with the input area;
    presenting the Braille keyboard via the touchscreen;
    generating, by the device, sensor data indicative of a location of an object relative to the input area;
    determining whether the location of the object is included within a first boundary of the first region, by comparing the sensor data to a threshold, wherein the location is determined based on the sensor data satisfying the threshold;
    based on the determined location, generating, by the device, an audible verbal command associated with a direction to move the object towards the first region of the input area, wherein the first region corresponds to a particular virtual Braille key of the Braille keyboard, the audible verbal command ceasing when the object is within the first region;
    generating, by the device, sensor data over a time period indicative of the location of the object relative to the input area over the time period;
    determining a rate of travel of the object with respect to a second boundary of the first region; and
    generating a second audible verbal command indicating a direction of travel of the object indicating a potential travel of the object out of the second boundary of the first region.

5. A apparatus to provide a virtual Braille keyboard, the apparatus comprising:
    a touchscreen having an input area;
    one or more computer processors; and
    a memory storing a program executable by the one or more computer processors to perform an operation comprising:
        receiving an identifier of a user;
        accessing, based on the identifier, a layout of Braille keys that is specific to the user, the layout having associated parameters including a count of fingers of the user;
        dividing an input area of the touchscreen into multiple regions including a first region, wherein each region of the multiple regions corresponds to a different virtual Braille key of a Braille keyboard based on the layout;
        determining an orientation of the apparatus relative to gravity;
        selectively activating, based on the orientation, one or more columns of sensors or one or more rows of sensors associated with the input area;
        presenting the Braille keyboard via the touchscreen;
        generating sensor data indicative of a location of an object relative to the input area;
        determining whether the location of the object is included within a first boundary of the first region, by comparing the sensor data to a threshold, wherein the location is determined based on the sensor data satisfying the threshold;
        based on the determined location, generating, an audible verbal command associated with a direction to move the object towards the first region of the input area, wherein the first region corresponds to a particular virtual Braille key of the Braille keyboard, the audible verbal command ceasing when the object is within the first region;
        generating sensor data over a time period indicative of the location of the object relative to the input area over the time period;
        determining a rate of travel of the object with respect to a second boundary of the first region; and
        generating a second audible verbal command indicating a direction of travel of the object indicating a potential travel of the object out of the second boundary of the first region.

* * * * *